US008006111B1

(12) United States Patent
Faibish et al.

(10) Patent No.: US 8,006,111 B1
(45) Date of Patent: Aug. 23, 2011

(54) INTELLIGENT FILE SYSTEM BASED POWER MANAGEMENT FOR SHARED STORAGE THAT MIGRATES GROUPS OF FILES BASED ON INACTIVITY THRESHOLD

(75) Inventors: Sorin Faibish, Newton, MA (US); Peter Bixby, Westborough, MA (US); Percy Tzelnic, Concord, MA (US)

(73) Assignee: EMC Corporation, Hopkinton, MA (US)

( * ) Notice: Subject to any disclaimer, the term of this patent is extended or adjusted under 35 U.S.C. 154(b) by 943 days.

(21) Appl. No.: 11/859,100

(22) Filed: Sep. 21, 2007

(51) Int. Cl.
*G06F 1/32* (2006.01)
(52) U.S. Cl. ......... 713/324; 711/114; 711/165; 713/320
(58) Field of Classification Search .................. 713/320, 713/324; 711/114, 165
See application file for complete search history.

(56) References Cited

U.S. PATENT DOCUMENTS

| | | | |
|---|---|---|---|
| 5,893,140 A | 4/1999 | Vahalia et al. |
| 6,161,104 A | 12/2000 | Stakutis et al. |
| 6,173,293 B1 | 1/2001 | Thekkath et al. |
| 6,237,063 B1 | 5/2001 | Bachmat et al. |
| 6,324,581 B1 | 11/2001 | Xu et al. |
| 6,341,333 B1 | 1/2002 | Schreiber et al. |
| 6,711,649 B1 | 3/2004 | Bachmat et al. |
| 6,766,416 B2 | 7/2004 | Bachmat |
| 6,775,679 B2 | 8/2004 | Gupta |
| 6,904,470 B1 | 6/2005 | Ofer et al. |
| 6,938,039 B1 | 8/2005 | Bober et al. |
| 6,976,134 B1 | 12/2005 | Lolayekar et al. |
| 6,985,914 B2 | 1/2006 | Venkatesh et al. |
| 7,024,427 B2 | 4/2006 | Bobbitt et al. |
| 7,428,622 B2 * | 9/2008 | Tulyani .......................... 711/161 |
| 7,444,662 B2 | 10/2008 | Faibish et al. |
| 7,698,517 B2 * | 4/2010 | Tulyani .......................... 711/161 |
| 2004/0030822 A1 | 2/2004 | Rajan et al. |
| 2005/0198401 A1 | 9/2005 | Chron et al. |
| 2005/0246382 A1 | 11/2005 | Edwards |
| 2006/0075191 A1 | 4/2006 | Lolayekar et al. |
| 2006/0212746 A1 | 9/2006 | Amegadzie et al. |
| 2007/0179990 A1 | 8/2007 | Zimran et al. |
| 2007/0266056 A1 | 11/2007 | Stacey et al. |

OTHER PUBLICATIONS

E. Pinheiro and R. Bianchini, Energy conservation techniques for disk array-based servers, In the 18th International Conference on Supercomputing, Jun. 2004.*
Uresh Vahalia, Unix Internals: The New Frontiers, 1996, p. 261-289 and 338-371, Prentice-Hall, Inc., Upper Saddle River, NJ.

(Continued)

*Primary Examiner* — Albert Wang
(74) *Attorney, Agent, or Firm* — Richard Auchterlonie; Novak Druce & Quigg, LLP

(57) ABSTRACT

A file server includes active storage containing frequently accessed files, and active/inactive disk drives for containing infrequently accessed files. Groups of the files having become inactive in the active storage are successively migrated to respective evacuated active/inactive disk drives so that each active/inactive disk drive is loaded with files having a similar probability of access when access to the active/inactive disk drive reaches an inactivity threshold for powering down the active/inactive disk drive. Storage of the active/inactive disk drives is reclaimed when an oldest group of the files is archived or when an active/inactive disk drive is evacuated by migrating files from the active/inactive disk drive to storage having been released in other disk drives by promotion of files for client access to the promoted files. Therefore, recovery of storage can be planned and scheduled in advance and performed efficiently in a background process.

19 Claims, 16 Drawing Sheets

OTHER PUBLICATIONS

"Enginuity: The Symmetrix Storage Operating Environment," EMC White Paper, 2005, 22 pages, EMC Corporation, Hopkinton, MA.

"EMC Symmetrix DMX Architecture," Product Description Guide, 2004, 76 pages, EMC Corporation, Hopkinton, MA.

"Celerra Data Migration Service (CDMS)," White Paper, Jan. 2002, 14 pages, EMC Corporation, Hopkinton, MA.

David Reine, "EMC Takes The Next Step—Moves Multi-Tiering Inside Symmetrix," The Clipper Group Navigator, Aug. 18, 2005, 5 pages, Clipper Group Inc., Wellesley, MA.

"Information Lifecycle Management: An Automated Approach," Technical White Paper, Dec. 8, 2003, 20 pages, EMC Corporation, Hopkinton, MA.

"Automated Resource Management," Technology Brief—Aug. 2002, 3 pages, The Enterprise Storage Group, Milford, MA.

S. Kang and A. Reddy, Virtual Allocation: A scheme for flexible storage allocation, Proc. of OASIS workshop in conjunction with ASPLOS, Oct. 2004, 5 pages, Association for Computing Machinery, New York, NY.

Alan Radding, "ATA/SATA drives fitting bigger niches," Storage Networking World Online, Mar. 8, 2004, 3 pages, Computerworld, Framingham, MA.

"Adaptive Power Management for Mobile Hard Drives," Apr. 1999, 11 pages, IBM Corp., San Jose, CA.

Colarelli et al., "The Case for Massive Arrays of Idle Disks (MAID)," USENIX Conference on File and Storage Technologies (FAST), Monterey, CA, Jan. 2002, 6 pages, USENIX, Berkeley, CA.

Zhu et al., "Reducing Energy Consumption of Disk Storage Using Power-Aware Cache Management," 10th International Symposium on High Performance Computer Architecture, IEEE Computer Society, 2004, 12 pages, IEEE, New York, NY.

Zhu et al., "PB-LRU: A Self-Tuning Power Aware Storage Cache Replacement Algorithm for Conserving Disk Energy," ICS'04, Jun. 26-Jul. 1, 2004, Saint-Malo, France, 10 pages, ACM, New York, NY.

Alex Jarabuto, HDD Diet: Power Consumption and Heat Dissipation, Jul. 11, 2005, 21 pages, digit-life.com, Byrds Research & Publishing, Ltd, Moscow, Russia.

Zedlewski et al., "Modeling Hard-Disk Power Consumption," FAST '03 Technical Program, Mar. 31-Apr. 2, San Francisco, 14 pages, USENIX, Berkeley, CA.

Bucy et al., The DiskSim Simulation Environment Version 3.0 Reference Manual, School of Computer Science, CMU-CS-03-102, Jan. 2003, 65 pages, Carnegie Mellon University, Pittsburg, PA.

"Half of stored files will never be accessed," ElectricNews.Net, theregister.co.uk, May 15, 2007, 2 pages, The Register, London, United Kingdom.

\* cited by examiner

```
FSID[E1:]
    FREE SPACE 128590542 FS BLOCKS
    FID[FILE B], FID[STUB FOR FILE B], 3029 FS BLOCKS
    ⋮

FSID[E2:]
    FREE SPACE 579318532 FS BLOCKS
    FID[FILE B], FID[STUB FOR FILE B], 18305 FS BLOCKS
    ⋮
```
← 204

INTELLIGENT FILE SYSTEM BASED POWER MANAGEMENT FOR SHARED STORAGE THAT MIGRATES GROUPS OF FILES BASED ON INACTIVITY THRESHOLD

FIELD OF THE INVENTION

The present invention relates generally to file servers, and specifically to reduction of power consumption by disk drives in the file servers.

BACKGROUND OF THE INVENTION

Considerable work has been done over the years to save power consumed by disk drives in portable computers. The power consumed by a disk drive in a portable computer substantially limits the duration of time that the portable computer can be operated from an internal battery. A common solution to this problem has been to "spin down" the disk drive when the disk drive has not been accessed for a certain period of time. A more sophisticated solution, known as adaptive power management, is to provide the disk drive with additional low-power modes between the "active" and "sleep" modes, and to change dynamically inactivity thresholds for transitioning to the low-power modes based on user behavior as indicated by a history of disk access.

Recently there has been an increasing desire to reduce the power consumed by disk storage in data centers and server farms. The power consumed by the disk storage has been about one quarter or more of the total power consumption by the data center or server farm. In addition to the cost of the electricity for powering the disk drives, there is a cost of electricity and equipment for cooling the data facility, and a reduction in the reliability and lifetime of the disk drives due to operation at increased temperature. More recently there has been a concern of power shortages in densely populated areas such as New York City, and a strong desire to avoid power shortages via energy conservation for a cleaner environment.

Studies of power management for conventional multiple-disk storage systems have indicated that the high volume of activity in such systems restricts the potential for energy savings of the adaptive power management techniques because the average idle periods of the disks are too small to justify the cost of spinning the disks up and down. However, the adaptive power management techniques have been proposed for hierarchical storage systems in which idle disks replace infrequently-accessed tape storage. Researchers have also begun to investigate power-aware storage cache management techniques for increasing the idle periods of disks in order to justify spin-up costs. These investigations show that power cycling must be done in an intelligent fashion or else it may actually increase power consumption rather than reduce it.

A conventional hierarchical storage system has a file system interface to a disk storage system backed by a tape library serving as a final repository for data. In a hierarchical storage architecture known as a Massive Arrays of Idle Disks (MAID), the tape library is replaced with passive disk drives. A relatively small power envelope is obtained by a combination of power management of the passive disk drives and the use of a cache of active disk drives or data migration from active disk drives to the passive disk drives. See Colarelli et al., "The Case for Massive Arrays of Idle Disks (MAID)," USENIX Conference on File and Storage Technologies (FAST), January 2002, Monterey, Calif.

Power-aware storage cache management techniques are reported in Zhu et al., "Reducing Energy Consumption of Disk Storage Using Power-Aware Cache Management," 10th International Symposium on High Performance Computer Architecture, IEEE Computer Society, 2004, and Zhu et al., "PB-LRU: A Self-Tuning Power Aware Storage Cache Replacement Algorithm for Conserving Disk Energy," ICS'04, Jun. 26-Jul. 1, 2004, Saint-Malo, France, ACM. For writes, if a disk is inactive, the write can be made to a persistent log, and written from the log to disk when the disk becomes active due to a read. The cache replacement algorithm should selectively keep blocks from "inactive" disks in the storage cache longer and thus extend the idle period lengths of those disks. One method of doing this is to measure disk activity and periodically update a classification of disk activity. Another method is to divide the entire cache into separate partitions, one for each disk, and manage each partition separately.

SUMMARY OF THE INVENTION

In accordance with one aspect, the invention provides a method of operating a file server for power savings. The file server includes active storage containing frequently accessed files, and active/inactive disk drives for containing infrequently accessed files. The method includes successively migrating groups of the files from the active storage to respective evacuated ones of the active/inactive disk drives. The files in each group of files are migrated when the files in each group of files become inactive in the active storage. The files in each group of files are selected to have a similar probability of access when access to the active/inactive disk drive containing the group of files reaches an inactivity threshold for powering down the active/inactive disk drive containing the group of files. The method further includes powering down the disk drive containing each group of files when access to the active/inactive disk drive containing the group of files reaches the inactivity threshold for powering down the active/inactive disk drive containing the group of files.

In accordance with another aspect, the invention provides a method of operating a file server for power savings. The file server includes active storage containing frequently accessed files, and active/inactive disk drives for containing infrequently accessed files. The method includes successively migrating groups of the files from the active storage to respective evacuated ones of the active/inactive disk drives. The files in each group of files are migrated when the files in each group of files become inactive in the active storage, and the active/inactive disk drives containing the groups of files are maintained in a queue. The method also includes responding to client requests for access to specified files in the active/inactive disks by promoting the specified files to the active storage and releasing storage of the specified files from the active/inactive disks containing the specified files. The method further includes powering down the active/inactive disk drive containing said each group of files when access to the active/inactive disk drive containing said each group of files reaches an inactivity threshold for powering down the active/inactive disk drive containing said each group of files. The method also includes maintaining a map in the active storage of used and unused storage in the active/inactive disk drives in the queue. The method further includes accessing the map to plan for evacuation of at least one of the active/inactive disk drives in the queue by migrating files from said at least one of the active/inactive disk drives in the queue to released storage of at least some of the specified files, and then executing the plan to evacuate said at least one of the active/inactive disk drives in the queue.

In accordance with yet another aspect, the invention provides a file server. The file server includes at least one data processor programmed for responding to client requests for file access, active storage coupled to the at least one data processor for client access to frequently accessed files in the active storage, and active/inactive disk drives coupled to the at least one data processor for client access to infrequently accessed files in the active/inactive disk drives. Each of the active/inactive disk drives has a power savings capability of powering down from an active state to a normally inactive state when access to the active/inactive disk drive reaches an inactivity threshold. The at least one data processor is further programmed for maintaining a queue of the active/inactive disk drives by migrating infrequently accessed files from the active storage to an evacuated active/inactive disk drive becoming a youngest active/inactive disk drive on the queue, promoting files in the active/inactive disk drives in the queue to the active storage and releasing storage of the promoted files in the active/inactive disk drives in the queue in response to client requests for access to the files in the active/inactive disk drives in the queue, and evacuating files from an oldest active/inactive disk drive from the queue.

BRIEF DESCRIPTION OF THE DRAWINGS

Additional features and advantages of the invention will be described below with reference to the drawings, in which.

Figure 1:
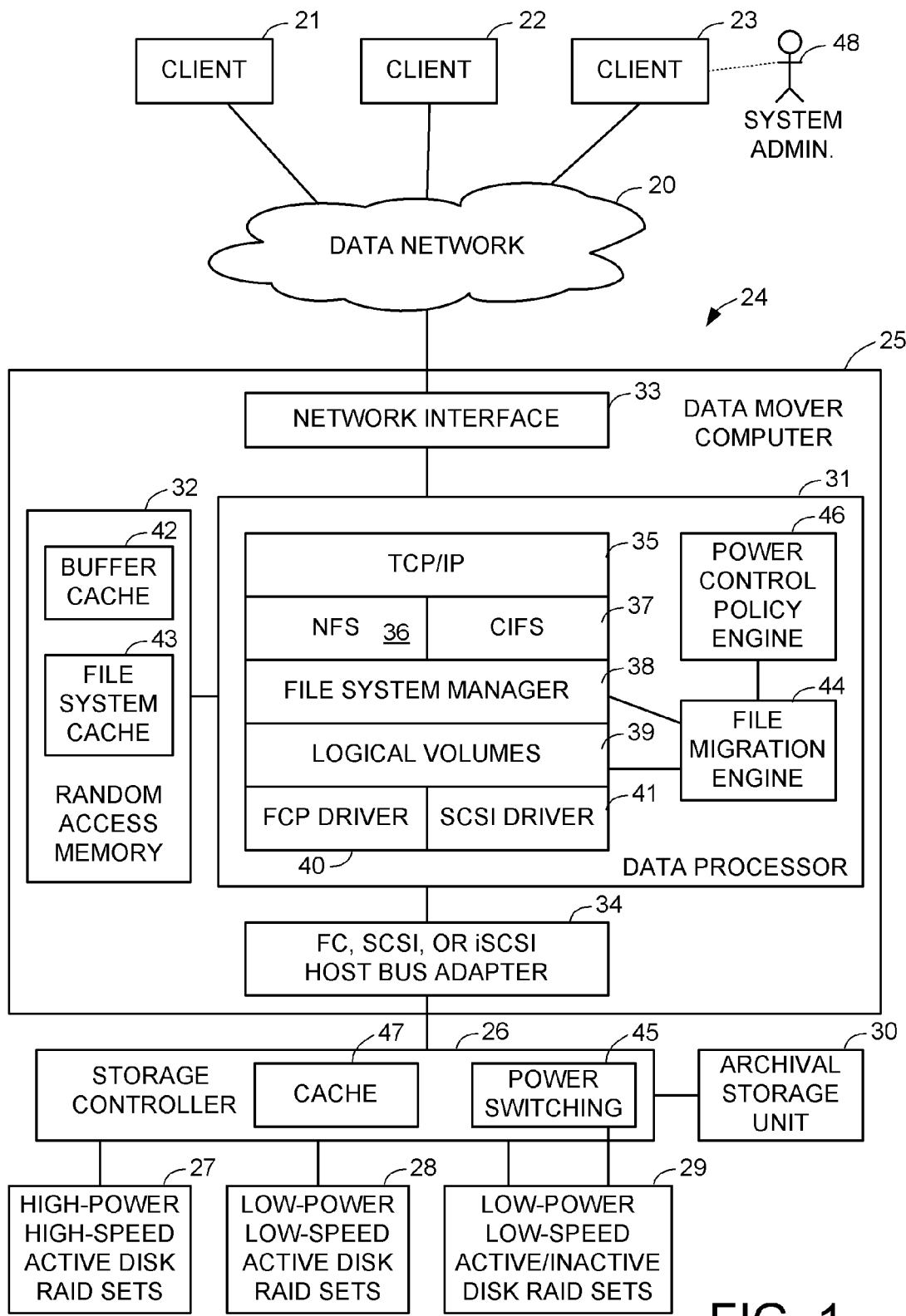
FIG. 1 is a block diagram of a hierarchical storage system in accordance with the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system incorporating the present invention. The data processing system includes a data network 20 interconnecting clients 21, 22, 23 to a network file server 24. The data network 20 may include any one or more of network connection technologies, such as Ethernet, and communication protocols, such as TCP/IP. The clients 21, 22, 23, for example, are workstations such as personal computers using either the UNIX® operating system or the Microsoft WINDOWS® operating system. One of the clients 23 is operated by a system administrator 48.

The network file server 24 includes a data mover computer 25, a storage controller 26, redundant arrays of inexpensive disks (RAID) 27, 28, 29, and an archival storage unit 30. The network file server 24 is managed as a dedicated network appliance, integrated with popular network file systems in a way, which, other than its superior performance, is transparent to the end user. The data mover computer 25, for example, is a high-end commodity computer. Further details regarding the construction of a network file server using a data mover computer and a storage controller are found in Vahalia et al., U.S. Pat. No. 5,893,140 issued Apr. 6, 1999, incorporated herein by reference, and Xu et al., U.S. Pat. No. 6,324,581, issued Nov. 27, 2001, incorporated herein by reference.

The data mover computer 25 includes a data processor 31, random access memory 32, a network interface 33 providing a port to the data network 20, and a host bus adapter 34 for providing a Fibre Channel (FC), Small Computer Systems Interface (SCSI), or SCSI over IP (iSCSI) link to the storage controller 26.

The data processor 31 is programmed primarily for servicing network client requests for access to files stored in the RAID sets of disk drives 27, 28, 29. This programming includes a TCP/IP programming layer 35 for communicating with the network clients 21, 22, 23 in accordance with the Transmission Control Protocol (TCP), a Network File System (NFS) module 36 for network file access in accordance with the NFS file access protocol, a Common Internet File System (CIFS) module 37 for network file access in accordance with the CIFS file access protocol, a file system manager 38, a logical volumes layer 39, a Fiber Channel Protocol (FCP) driver 40, and an SCSI driver 41.

The random access memory 32 includes a buffer cache 42 and a file system cache 43. Read data and write data are streamed through the buffer cache 42 between the network clients 21, 22, 23 and the storage controller 26. The file system manager 38 maintains recently accessed file system data and metadata in the file system cache 43. For example, each file system is a UNIX®-based file system managed as described in Uresh Vahalia, *Unix Internals: The New Frontiers*, Chapter 9, "File System Implementations," Prentice-Hall, Inc., New Jersey, 1996, p. 261-289.

Each file system includes a hierarchy of directories and files. Each file system is built on a logical volume of contiguous logical block addresses of storage accessible through the storage controller 26. The storage controller 26 is configured to map the logical block addresses of each logical volume to one or more of the RAID sets 27, 28, 29. A first group of RAID sets 27 includes relatively high-power, high-speed active (i.e., powered-up and spinning) disk RAID sets. A second group of RAID sets 28 includes relatively low-power, low-speed active (i.e., powered up and spinning) disk RAID sets. A third group of RAID sets 29 includes relatively low-power, low-speed active/inactive disk RAID sets including disk drives that are switched from an active mode to a normally inactive mode based on an adaptive inactivity threshold. The storage controller 26 may also have a random access cache memory 47 for storing recently accessed data in the RAID sets.

The disk storage of the network file server 25 is arranged in a hierarchical fashion so that data frequently accessed by the network clients is kept at higher levels of a storage hierarchy, and data that is infrequently accessed by the network clients is kept at lower levels of the storage hierarchy. At any given time, the data of each file resides at a particular one of the levels of the storage hierarchy. Unless data of a file is "pinned" at a particular level of the storage hierarchy, the prolonged absence of any client access to the file will result in the file data being migrated to the archival storage unit 30.

The archival storage unit 30, for example, is a tape library unit or a compact disk (CD-R) juke-box. The attributes of each file, for example, include an indication of the current level of the file in the storage hierarchy, an indication of whether or not the file data is "pinned" to that level, an indication of whether or not the file is presently being migrated to another level in the storage hierarchy, and if so, the level to which the file data is being migrated.

In order to automatically migrate file data between levels of the storage hierarchy, the data processor 31 is programmed with a file migration engine 44. The file system or the logical volume upon which the file system is built is constructed so that the migration can be transparent to the clients 21, 22, 23. For example, to copy the file data from one level of the storage hierarchy to another, the file migration engine creates a new hidden file in the target level of the storage hierarchy, copies the file to the new hidden file, and once the entire file has been copied, the new file assumes the identity of the original file. Further details regarding the migration of files in this fashion are found in Bober et al., U.S. Pat. No. 6,938,039 entitled "Concurrent File Access At a Target File Server During Migration of File Systems Between File Servers Using a Network File System Access Protocol," issued Aug. 30, 2005, incorporated herein by reference.

Conventional program modules for the file system manager and the logical volumes layer in a file server might not already have a mechanism for allocating file system blocks of a selected level of the storage hierarchy to a given file. In this case, the conventional program modules could be used for creating a separate file system cell for each level of the storage hierarchy, and the file system cells could be linked together to form a client-visible meta file system including the files at the various levels of the storage hierarchy. See, for example, Uday K. Gupta, U.S. Pat. No. 6,775,679, entitled "Building a Meta File System from File System Cells," issued Aug. 10, 2004, incorporated herein by reference.

The present invention is more specifically directed to a file server having disk drives operating at different power levels by transitioning from an active mode to a normally inactive mode. For example, the storage controller 26 has power switching circuits 45 for selectively switching off the power to specified disk drives in the RAID sets 29. In this example, the data processor 31 may send a command to the storage controller 26 to set a specified one of the disk drives in the RAID sets 29 to a normally inactive mode. In response to such a command, the storage controller switches off the power to the specified disk drive once the disk drive has completed any pending read or write operation. In this normally inactive mode, if the storage controller 26 receives a command to read or write to the specified disk drive, then the storage controller will switch on power to the disk drive, wait some time for the disk drive to power up, and then send the read or write command to the disk drive. Once the disk drive has completed the read or write operation, if the storage controller has not received a subsequent request within a certain period of time to read or write to the disk drive, then the storage controller shuts off power to the disk drive.

In an alternative embodiment, the disk drives in the RAID sets 29 themselves recognize a command for putting the disk drive into a normally inactive "sleep mode" in which the disk drive has virtually no power consumption. In the "sleep mode," the power consumed is limited to that necessary for the disk drive to recognize a command to power-up the disk drive. For example, if the disk drive is in "sleep mode" and it receives a command to perform a read or write operation, it powers up, performs the read or write operation, and powers down if it does not receive a subsequent request within a certain period of time to read or write to the disk drive (or to cancel the "sleep mode").

In yet another embodiment, the storage controller 26 or each disk drive in the RAID sets 29 is programmed to power down each disk drive in the RAID sets 29 based on the access history of each disk drive in the RAID sets 29 in accordance with the technique of adaptive power management used in personal computers.

Power-up/power-down cycling of a disk drive must be performed in an intelligent fashion because continuous power-up/power-down cycling will consume about twice as much power as a disk that is powered up continuously. Moreover, to limit the peak power consumed by the network file server, only a small fraction of the disk drives in the RAID sets 29 should be powered up at any given time. In the file server 24, the data processor 31 is programmed with a power control policy engine 46 that controls when the disk drives in the disk RAID sets 29 are powered-up in order to conserve power and to limit the total peak power consumed by all of the disks drives.

The inventors have discovered that power-up/power-down cycling of disk drives in a shared storage environment often is ineffective because the conventional techniques do not effectively segregate files that fit a normal popularity and life-cycle model from those that do not fit the normal popularity and life-cycle model. For example, in a typical business enterprise, about 10% of the files are accessed 90% of the time, and up to 50% or more of the stored file will never be accessed again. Files that fit the normal popularity and life-cycle model (the "well-behaved files") have a probability of access that decreases exponentially with time, and files that do not fit the normal popularity and life-cycle model (the "problem files") have a probability of access that decreases at a slower rate with time. The conventional techniques are somewhat effective for minimizing penalties that the problem files impose upon the energy cost of the shared storage. The conventional techniques, however, do not realize all of the possible benefits of handling the well-behaved files in a most energy efficient manner once the well-behaved files have been segregated from the problem files.

Figure 2:
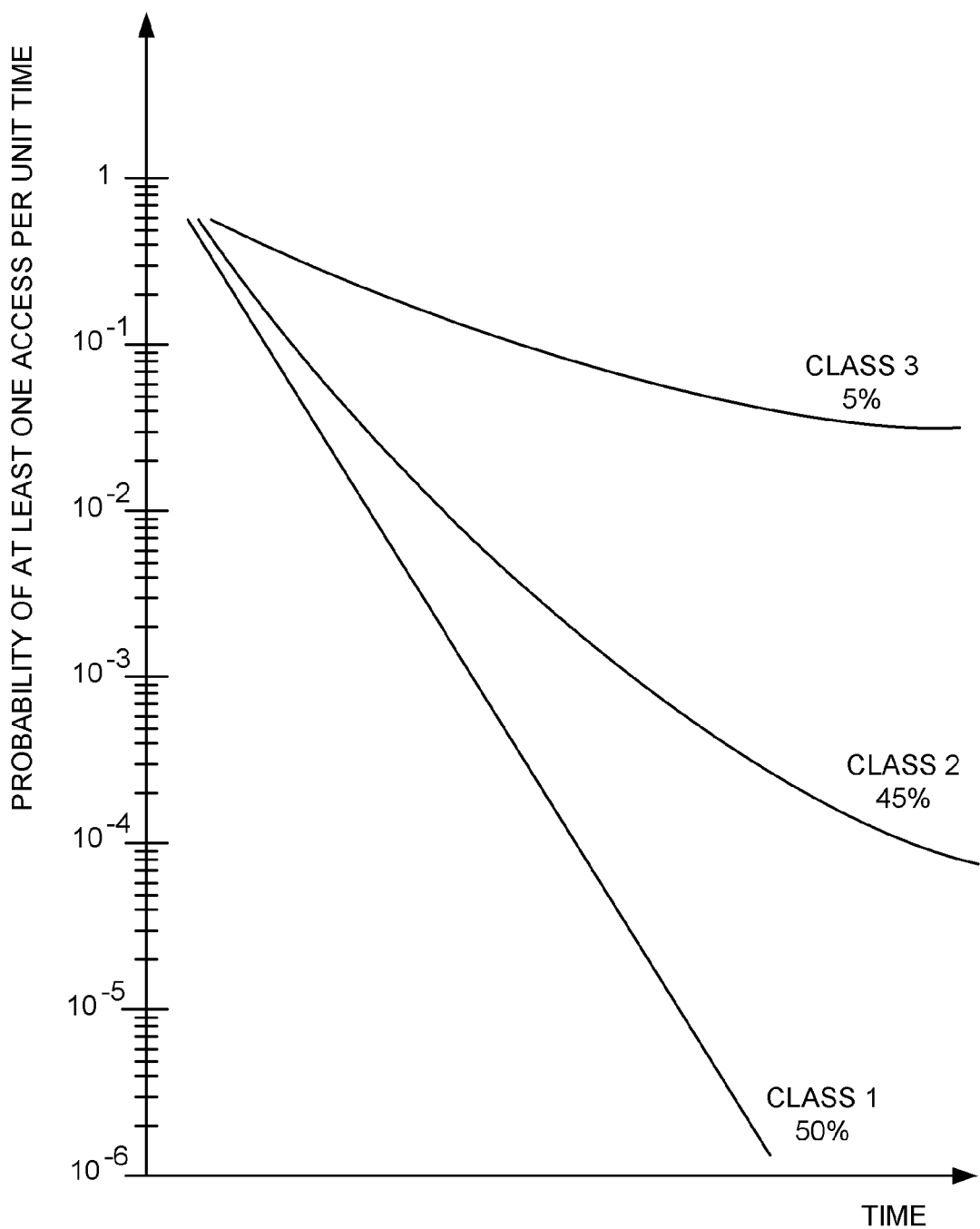
FIG. 2 is a graph of the probability of at least one access per unit time as a function of time for three classes of files in the hierarchical storage system of FIG. 1.

FIG. 2, for example, shows a graph of the probability of at least one access per unit of time verses time for each of three classes of files. Class 1 is the normal class comprising about 50% of the files in the RAID sets 27, 28, 29. Class 2 is the problem class comprising about 45% of the files in the RAID sets 27, 28, 29. Class 3 is a class comprising about 5% of the files in the RAID sets 27, 28, 29. In the system of FIG. 1, the power control policy engine 46 operates the file migration engine 44 so that the files of class 3 are confined primarily to the high-power high-speed active disk RAID sets 27, the files of class 2 become confined primarily to the low-power low-speed active disk RAID sets 28, and the files of class 1 become confined primarily to the low-power low-speed active/inactive RAID sets 29 (at least prior to migration to the archive storage unit 30).

For keeping the problem files segregated from the well-behaved files, an access history or statistic is maintained at least for each file in the low-speed low-power RAID sets 28 and 29. Significant power savings in the system of FIG. 1 are obtained primarily by proper segregation of the problem files from the well-behaved files so that the low-power low-speed active/inactive disk RAID sets 28 transition from active mode to normally inactive mode more quickly and exhibit less frequent power-on/power-off cycling once they have transitioned to the normally active mode. A significant characteristic of each class is the probability of access at a substantial time since the file was last modified, because this characteristic indicates a lowest level in the storage hierarchy at which the file should be kept. For a given file in the low-power low-speed RAID sets 28 and 29, a pertinent measurable characteristic of the file is the duration of time between the time when the file is placed in the low-power low-speed active disk RAID sets 28 and when the file is thereafter accessed. For example, a recent history of this characteristic is kept for each file, or a statistic of this characteristic is kept for each file, such as an indication of whether an access frequency for each file is known, and if so, a mean value of this access frequency.

An important decision regarding a file is whether or not the file should be migrated into one of the low-power low-speed active/inactive disk RAID sets 29. This decision is made by comparing the duration of time since the last access of the file (i.e., the degree of inactivity of the file) to a threshold. By keeping some access history or an access statistic for each file, the comparison can be adjusted based on the access history or access statistic so that files having a history of activity that is significant relative to the threshold must be inactive for a greater duration of time in order to be migrated into one of the low-power low-speed active/inactive disk RAID sets 29.

Figure 3:
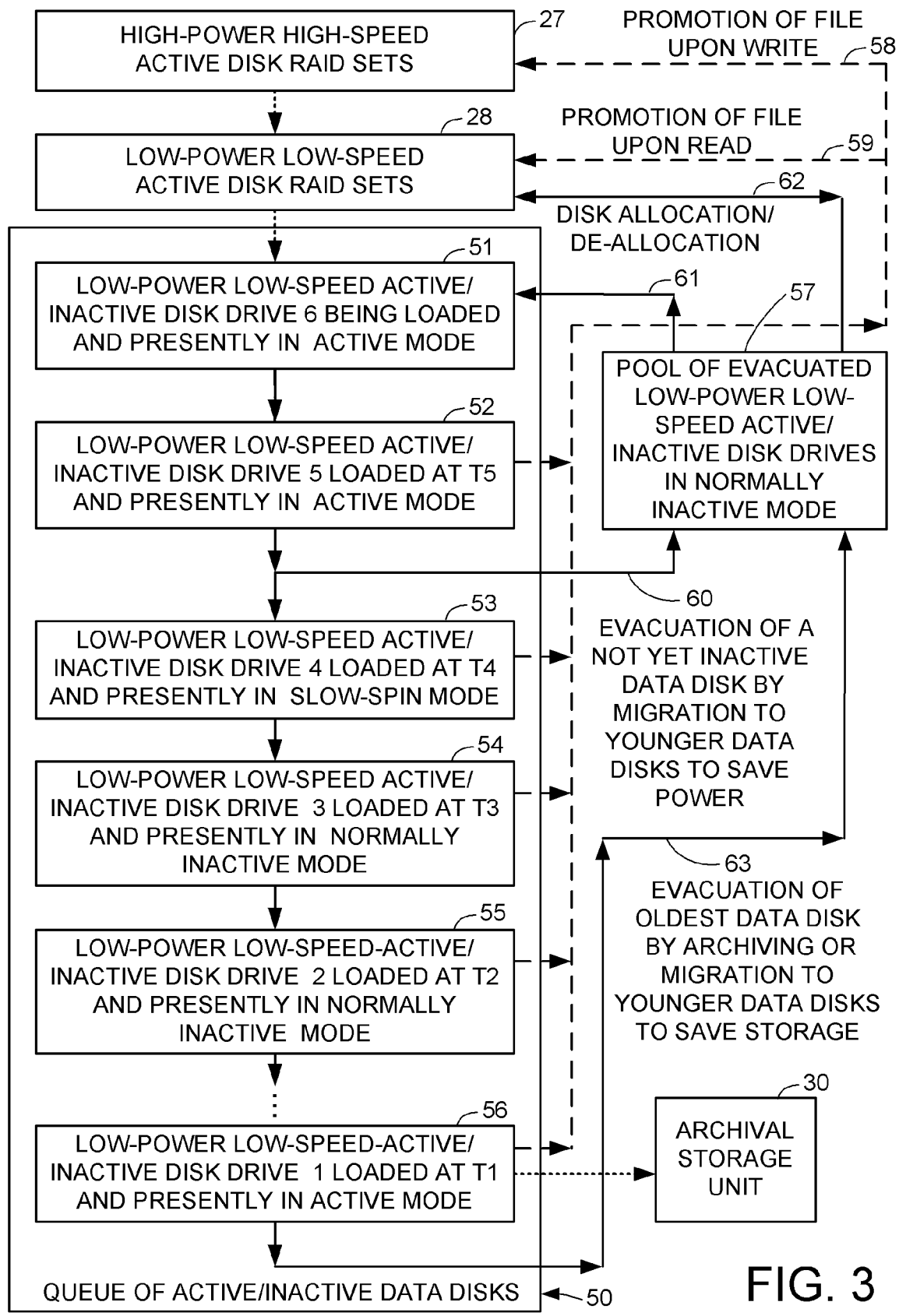
FIG. 3 is a block diagram showing a queue of low-power low-speed active/inactive data disks in the storage hierarchy of the hierarchical storage system of FIG. 1.

FIG. 3 shows the storage hierarchy of the disk storage in the file server of FIG. 1. The copying or migration of files is indicated by arrows with dashed lines, and a change in state or level of the disk storage is indicted by an arrow with a solid line. The low-power low-speed active/inactive data disks 51 to 56 (of the low-power low-speed active/inactive RAID sets 29 of FIG. 1) are arranged in a queue 50. In general, this queue 50 includes more than just the six data disks 51-56 as shown, and every consecutive four data disks in the queue 50 (unless and until a data disk becomes evacuated) has an associated parity disk to form one of the low-power low-speed active/inactive disk RAID sets (29 in FIG. 1).

To minimize disk accesses for maintaining the parity across each RAID set, the number of disks in each of the RAID sets is kept constant, and the active/inactive data disks are kept together in the RAID sets as an individual data disk is added to the queue 50 and loaded with data expelled from the low-power low-speed active disk RAID sets 28, or retired from the queue 50 and put in a pool 57 once the data disk is evacuated. In the pool 57, each RAID set is initially initialized by computing the parity across the data disks in the RAID set and writing this parity into the parity disk of the RAID set. In a background task, RAID sets returned to the pool 57 are also periodically scrubbed of any parity error by re-computing the parity across the data disks of each RAID set and comparing the re-computed parity to the parity in the parity disk of the RAID set.

At the top of the storage hierarchy, files are migrated from the high-power high-speed active disk RAID sets 27 to the low-power low-speed active disk RAID sets 28 on an as-needed basis by selecting the "least recently used" (LRU) file for evacuation from the high-power high-speed active disk RAID sets 27. For this purpose, the file system manager (38 in FIG. 1) notifies the file migration engine (44 in FIG. 1) when a file is created or modified, and in response, the file migration engine updates the LRU list. When the free space in the high-power high-speed active disk RAID sets 27 falls below a low-water mark, the file migration engine migrates the least-recently-used files from the high-power high-speed active disk RAID sets to the low-power low-speed active disk RAID sets 28, until the free space in the high-power high-speed active disk RAID sets exceeds a high-water mark.

Files are migrated from the low-power low-speed active disk RAID sets 28 to a low-power low-speed active/inactive disk drive 51 currently being loaded and presently in active mode. A file in the low-power low-speed active disk RAID sets 28 is selected for its data to be migrated when the file has not been accessed for an amount of time estimated to achieve the best power savings. This amount of time is a function of any past history of client access of the file when the file previously was in any one of the low-power low-speed active/inactive disk RAID sets 28. If there is a past history of client access of the file when the file previously was in a low-power low-speed active/inactive disk RAID set, then the file must not have been accessed for an increased amount of time for expulsion into the disk drive 51. For example, each file in the low-power low-speed active disk RAID sets 28 has a respective expulsion time for migration to the next low-power low-speed active/inactive disk drive 51 currently being loaded and presently in active mode. The file migration engine 44 keeps a list of the files ordered by this expulsion time, and periodically inspects this list to find files that should be migrated.

By successively migrating files from the low-power low-speed active disk RAID sets 28 into data disks of the low-power low speed active/inactive RAID sets 29 based on a respective expulsion time for each file, each data disk of each low-power low speed active/inactive RAID set contains a related generation of files, so that the files in each active/inactive data disk have a similar probability of access when access to the active/inactive data disk reaches an inactivity threshold for powering down the active/inactive data disk. Therefore, each data disk in the queue 50 is powered-down at an appropriate time and manner based on the frequency of access to the data disk. For example, each disk drive in the queue 50 is powered-down through intermediate power modes using the known adaptive power management techniques designed for disk drives for portable computers.

For example, when the disk drive 51 in active mode is being loaded, access statistics are collected for a youngest previously-loaded disk drive 52 in active mode, in order to determine precisely when to power down the disk drive 52. A next oldest disk drive 53 is operating in a "slow spin" intermediate power mode, in which the disk is spun at one-half normal speed. A next oldest disk drive 54 is in a normally inactive mode. A next oldest disk drive 55 is also in a normally inactive mode. At the lowest level in the storage hierarchy, an oldest disk drive 56 is in an active mode during the streaming of file data to the archival storage unit 30. Once the disk drive 56 is evacuated of file data, the disk drive 56 is returned to the pool 57 of evacuated low-power low-speed active/inactive disk drives in the normally inactive mode.

When a network client accesses a file at the lower levels of the storage hierarchy, the file is promoted to a higher level in the hierarchy. For example, when a network client performs a write access to the file, the file is migrated (along path 58) back to the uppermost level (the high-power high-speed active disk RAID sets 27). When a network client performs a read access to a file in a low-power low-speed active/inactive RAID set, the file is migrated back to the low-power low-speed active disk RAID sets 28 (along path 59).

In a network file server having a large number of low-power low-speed active/inactive RAID sets, the file promotion process may create so much free space in the low-power low-speed active/inactive data disks that it may be possible to obtain a power savings by evacuating a data disk drive before the disk drive is powered down to a normally inactive mode. The data disk drive is evacuated by migrating files in the data disk drive to younger data disks in the queue 50. In this case the evacuated disk drive is returned to the pool 57 along a path 60.

Disk drives are allocated from the pool 57 for a variety of uses. Disk drives are allocated from the pool 57 (along path 61) as needed for receiving files migrated from the low-power low-speed active disk RAID sets 28. Also, it is possible to use the same kind of disk drives for the low-power low-speed active disk RAID sets 28 and the low-power low-speed active/inactive disk RAID sets 51-56. In this case, RAID sets from the pool 57 can be dynamically allocated as needed (along path 62) to the low-power low-speed active disk raid sets 28. When there is sufficient free storage in the low-power low-speed active disk RAID sets, then the data disks of the RAID sets can be evacuated and the RAID sets de-allocated from the low-power low-speed active RAID sets 28 and returned to the pool 57.

The high-power high-speed active disk RAID sets 27, for example, are configured from Fibre Channel (FC) disk drives, and the low-power low-speed disk RAID sets 28 and 51-56 are configured from serial ATA disk drives. In addition, for power savings, the placement of the file data in the low-power low-speed disk RAID sets 28 and 29 can be different from the placement of the file data in the high-power high-speed active disk RAID sets 27.

Figure 4:
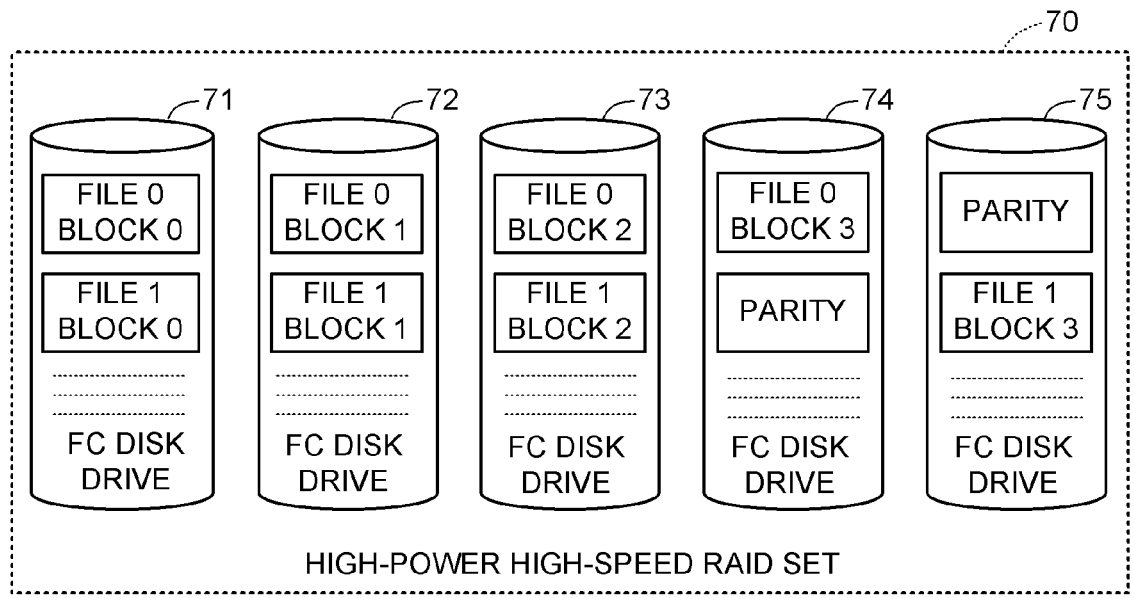
FIG. 4 is a block diagram of a high-power high-speed set of disks in a redundant array of inexpensive disks (RAID)

As shown in FIG. 4, for high-speed access to a file, the file blocks are striped across the disk drives 71, 72, 73, 74, 75 in the high-power high-speed RAID set 70 (used in the high-power high-speed active disk RAID sets 27 of FIG. 1). The striping shown is for a RAID level 5, although file data is also striped across all of the disk drives except an independent parity drive in a RAID level 3 set or a RAID level 4 set. A read of a file (File 0 or File 1) may cause a surge in power consumed by all of the data disk drives 71-75 in the RAID set 70. A write to the file (File 0 or File 1) may cause a surge in power consumed by all of the data disk drives 71-75 in the RAID set 70.

Figure 5:
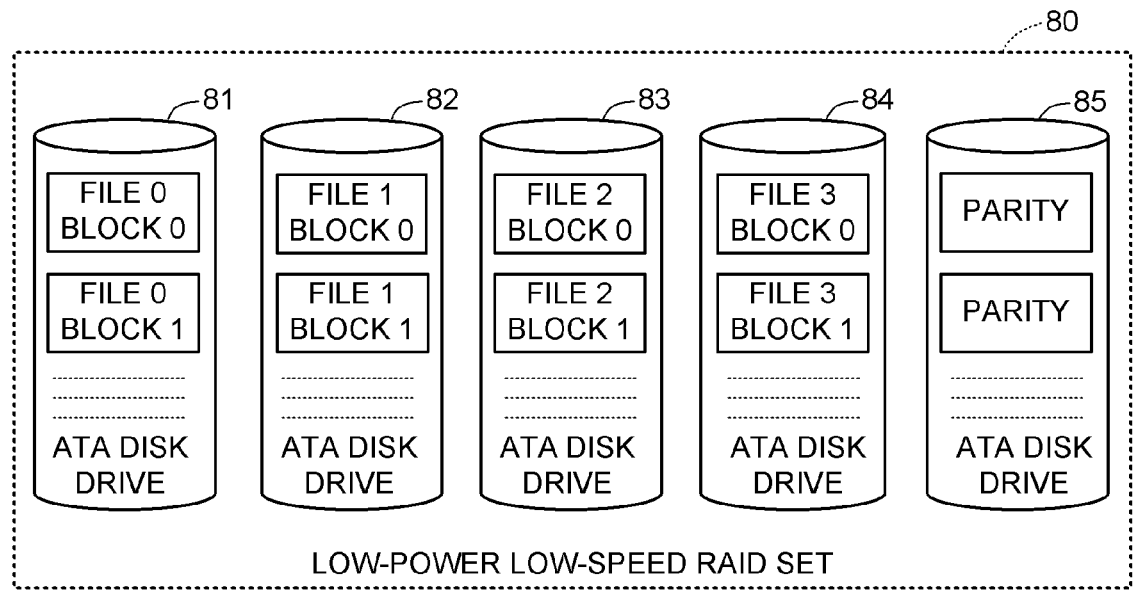
FIG. 5 is a block diagram of a low-power low-speed RAID set of disk drives.
Figure 6:
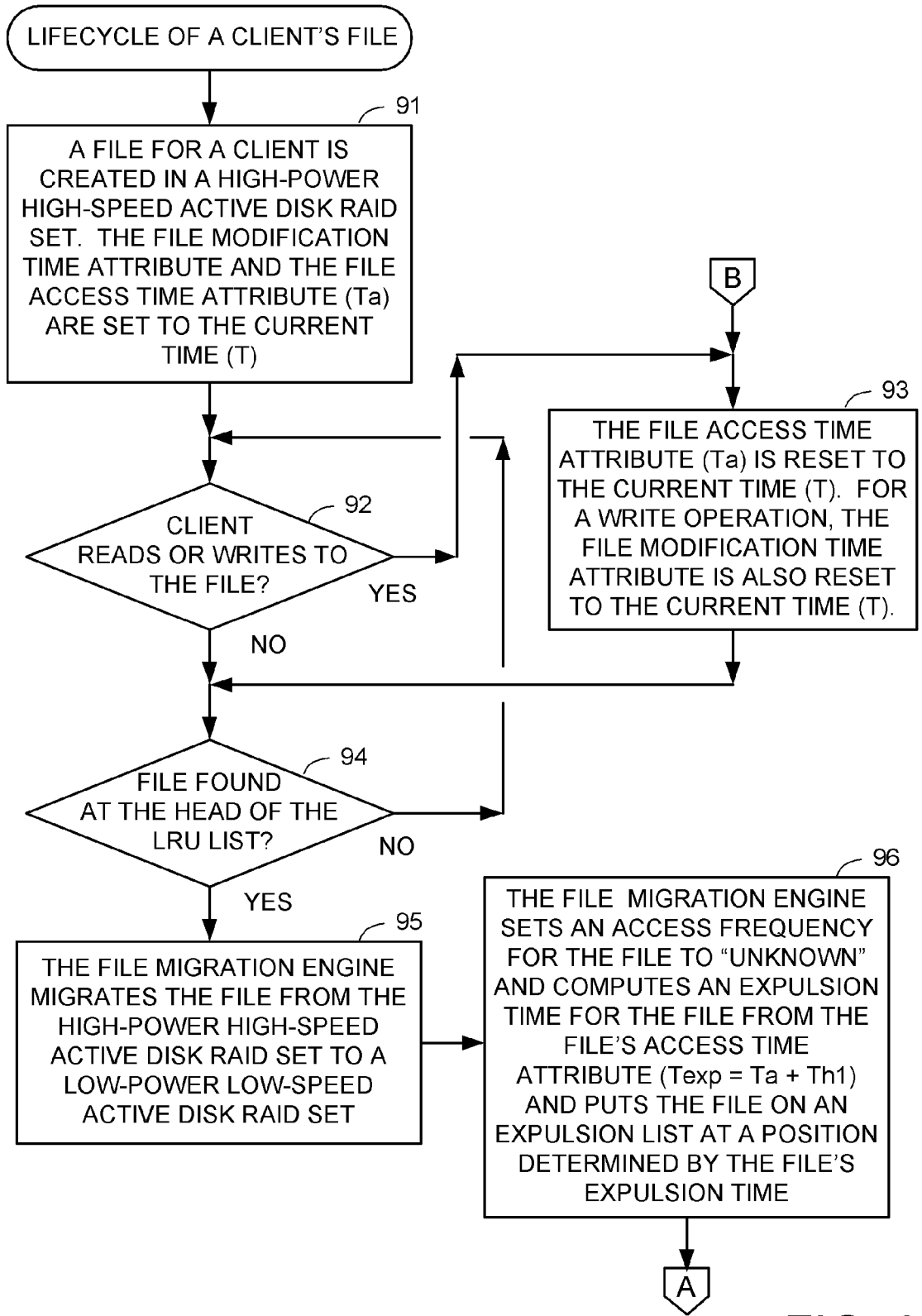
FIGS. 6, 7, 8, and 9 together comprise a flowchart showing how the power control policy engine and a migration engine in the hierarchical storage system of FIG. 1 are programmed to handle a client's file during the lifecycle of the file.

As shown in FIG. 5, for low power consumption, the file blocks are not striped across the disk drives 81, 82, 83, 84, 85 in the low-power low-speed RAID set 80 (used in the low-power low-speed active disk RAID sets 28 or in the low-power low-speed active/inactive disk RAID sets 29 of FIG. 1). In addition, an independent one of the disk drives 85 in the RAID set 80 stores the parity information (similar to RAID levels 3 or 4). In this fashion, a read access to a file (File 0, 1, 2, or 3) in the low-power low-speed RAID set 80 normally causes a surge in power consumption of only a single one of the disk drives (the one containing the file). If the RAID set 80 is in the normally inactive mode, only this single data disk drive needs to be powered-up for the read access. A write access to a file (File 0, 1, 2, or 3) in the low-power low-speed RAID set normally causes a surge in power consumption of just the data disk drive containing the file and the disk drive 84 containing the parity. If the RAID set 80 is in the normally inactive mode, just these two disk drives need to be powered up for the write access to the file.

FIGS. 6 to 9 show operation of the file migration engine (44 in FIG. 1), as directed by the power control policy engine (46 in FIG. 1), over the lifecycle of a client's file. In a first step 91, a file for a client is created in one of the high-power high-speed active disk RAID sets (27 in FIG. 1). The file modification time attribute and the file access time attribute (Ta) of the file are set to the current time (T). In step 92, if the client reads or writes to the file, then execution branches to step 93. In step 93, the file access time attribute (Ta) is reset to the current time. For a write operation, the file modification attribute is also reset to the current time. Execution continues from step 93 to step 94. Execution also continues from step 92 to step 94 if the client does not read or write to the file.

In step 94, the power control policy engine looks at the head of the LRU list when the policy control engine needs to increase free space in the high-power high-speed active disk RAID sets. If the client's file is not found at the head of the LRU list, then execution loops back to step 92. Otherwise, execution continues from step 94 to step 95. In step 95, the file migration engine migrates the file from the high-power high-speed active disk RAID set to one of the low-power low-speed active disk RAID sets (28 in FIG. 1). In step 96, the file migration engine sets an access frequency attribute for the file to "unknown" and computes an expulsion time (Texp) for the file from the file's access time attribute (Ta) by adding a predetermined threshold value (Th1). The threshold value (Th1) is an amount of time that the file should remain in the low-power low-speed active disk RAID set when the file is never accessed, and the power control policy engine may adjust this threshold value over time in order to balance file occupancy of the low-power low-speed active disk RAID sets (28 in FIG. 1) relative to the low-power low-speed active/inactive disk RAID sets (29 in FIG. 1). The power control policy engine puts the file on an expulsion list at a position determined by the file's expulsion time. Execution continues from step 96 to step 101 in FIG. 7.

Figure 7:
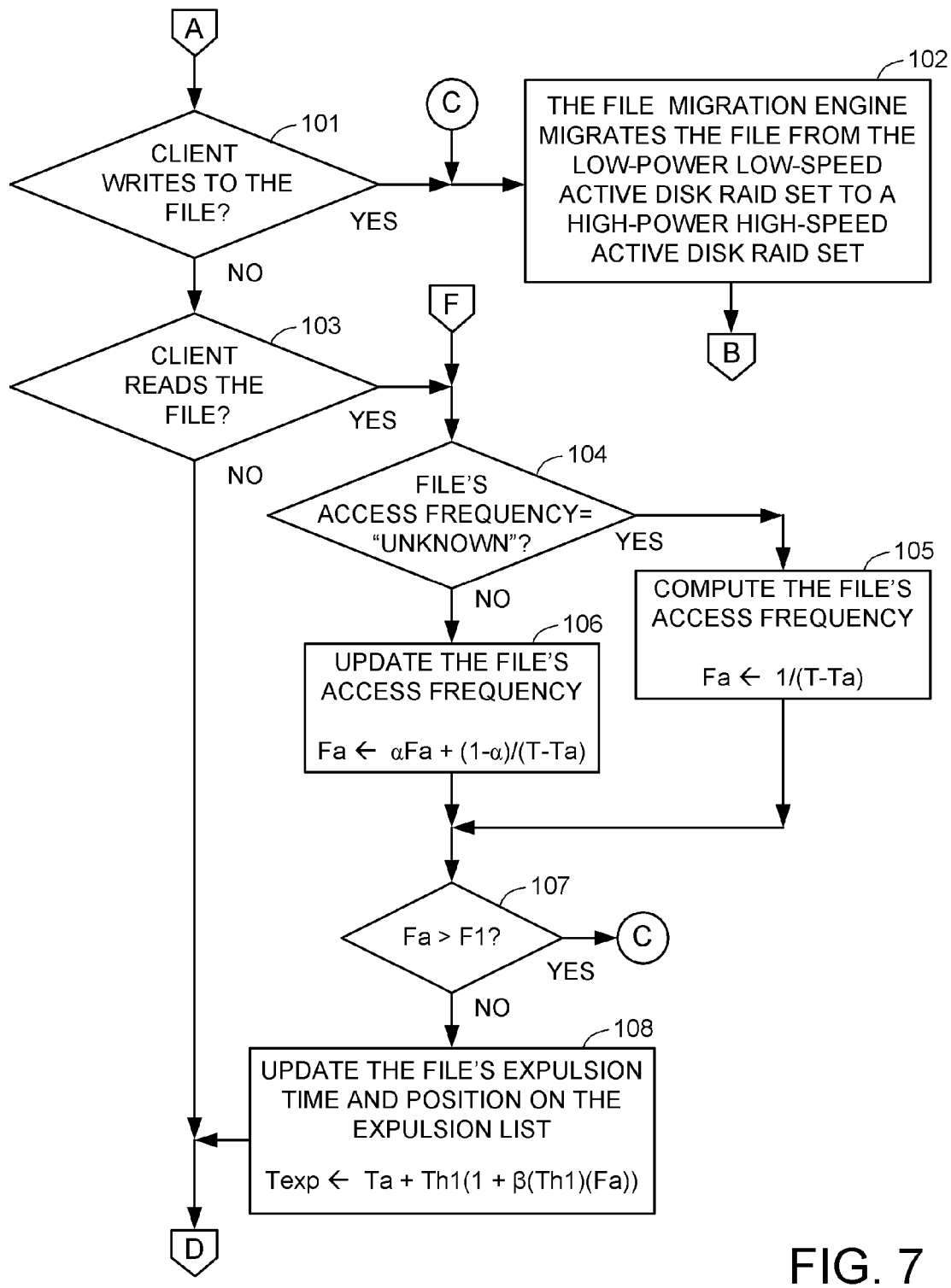

In step 101 of FIG. 7, if the client writes to the file, then execution braches to step 102. In step 102, the power control policy engine promotes the file by migrating the file from the low-power low-speed active disk RAID set to a high-power high-speed active disk RAID set. Execution loops from step 102 back to step 93 of FIG. 6. In step 101, if the client does not write to the file, then execution continues to step 103.

In step 103, if the client reads the file, then execution branches to step 104. In step 104, if the file's access frequency is "unknown," then execution branches to step 105. In step 105, the power control policy engine computes the file's access frequency as the reciprocal of the difference between the current time (T) and the file's access time attribute (Ta). In step 104, if the file's access frequency is not "unknown," then execution continues to step 106. In step 106, the file's access frequency is updated by computing a weighted average of the file's access frequency (Fa) and a new estimate (1/(T−Ta)) of the file's access frequency. For example, a new value of the file's access frequency is computed as $\alpha Fa+(1-\alpha)/(T-Ta)$, where $\alpha$ is a predetermined constant between 0 and 1 such as one-half. Execution continues from step 105 or step 106 to step 107. In step 107, the file's access frequency is compared to a predetermined threshold frequency F1 to determine whether or not the file should be promoted. If the file's access frequency is greater than the threshold frequency, then execution branches to step 102 to migrate the file from the low-power low-speed active disk RAID set to a high-power high-speed active disk RAID set.

In step 108, the file's expulsion time is updated as a function of the access frequency. For example, the expulsion time (Texp) is calculated as Ta+Th1*(1+β(Th1)*(Fa)), where β is a predetermined constant such as one. Thus, a file having a known access frequency due to read access in a low-power low-speed RAID set must be inactive for a longer period of time (proportional to β and the access frequency, Fa) than a file having an unknown access frequency to be expelled into the active/inactive data disk currently being loaded at the tail of the queue (50 in FIG. 3). The power control policy engine also updates the file's position on the expulsion list in response to a change in the file's expulsion time. After step 108, execution continues to step 111 in FIG. 8. Execution also continues to step 111 from step 103 when the client does not read the file.

Figure 8:
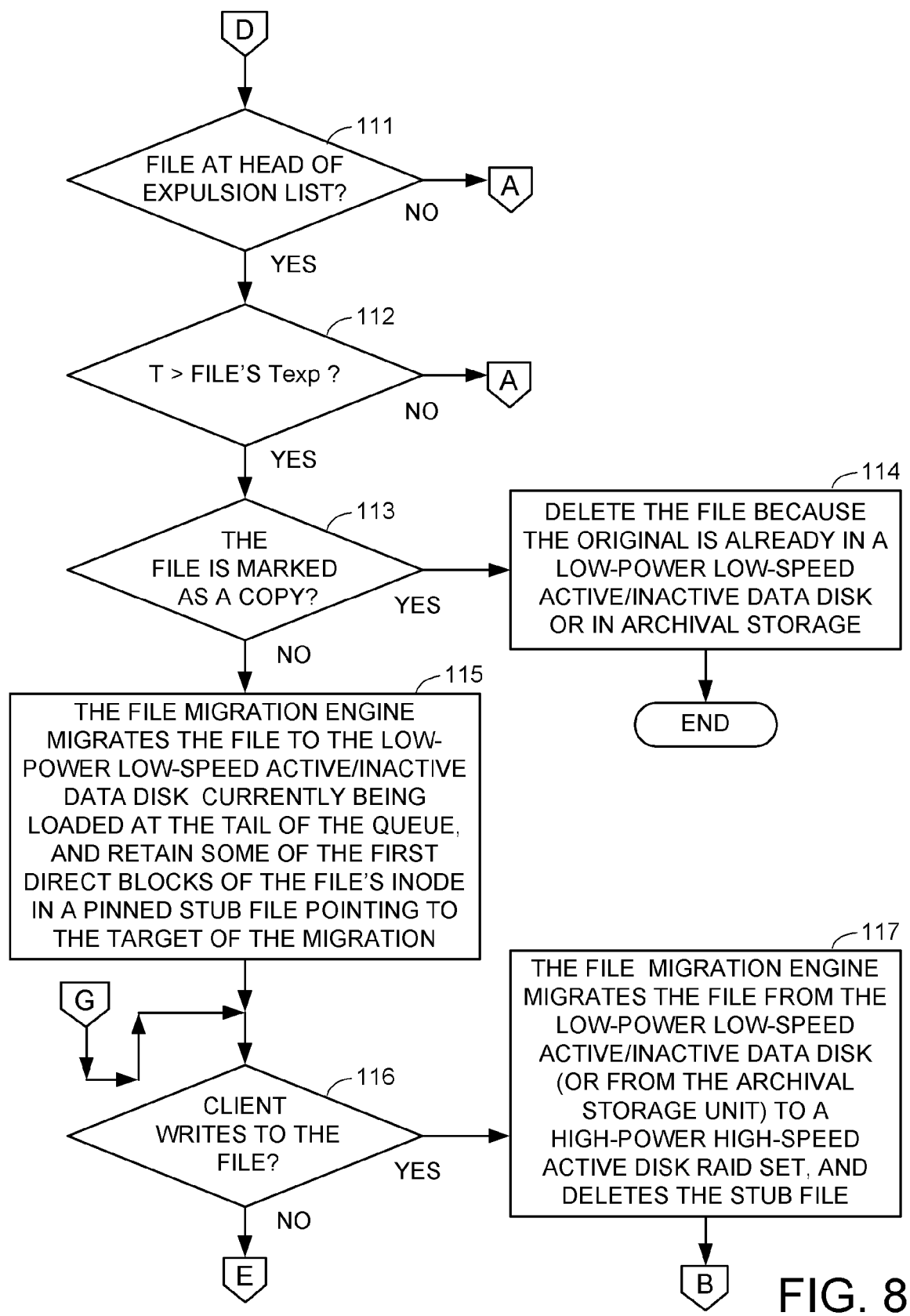

In step 111 of FIG. 8, if the client's file is not at the head of the expulsion list, then execution loops back to step 101 of FIG. 7. Otherwise, execution continues to step 112. In step 112, if the current time (T) is not greater than the file's expulsion time (T), then execution loops back to step 101 of FIG. 7. Otherwise, execution continues to step 113. In step 113, if the file has been marked as a copy, then execution continues to step 114. In step 114, the file is deleted because the marking of a file as a copy indicates that the original file is already in a low-power low-speed active/inactive disk RAID set or in archival storage. In step 113, if the file is not marked as a copy, then execution continues to step 115.

In step 115, the file migration engine migrates the file to the low-power low-speed active/inactive data disk currently being loaded at the tail of the queue (50 in FIG. 3), and retains some of the first direct blocks of the file in a pinned stub file pointing to the target of the migration. The pinned stub file also provides a way of rapidly accessing the attributes of the file when the file is not otherwise rapidly accessible once the low-power low-speed active/inactive data disk later powers down to a normally inactive mode or when the file is migrated to the archival storage unit. In step 116, if the client writes to the file in the low-speed low-power active/inactive data disk (or in the archival storage unit), then execution continues to step 117. In step 117, the file migration engine promotes the file back to the highest level in the storage hierarchy by migrating the file from the low-power low-speed active/inactive data disk (or from the archival storage unit) to a high-power high-speed active disk RAID set, and deleting stub file. Execution loops from step 117 back to step 93 of FIG. 6.

Figure 9:
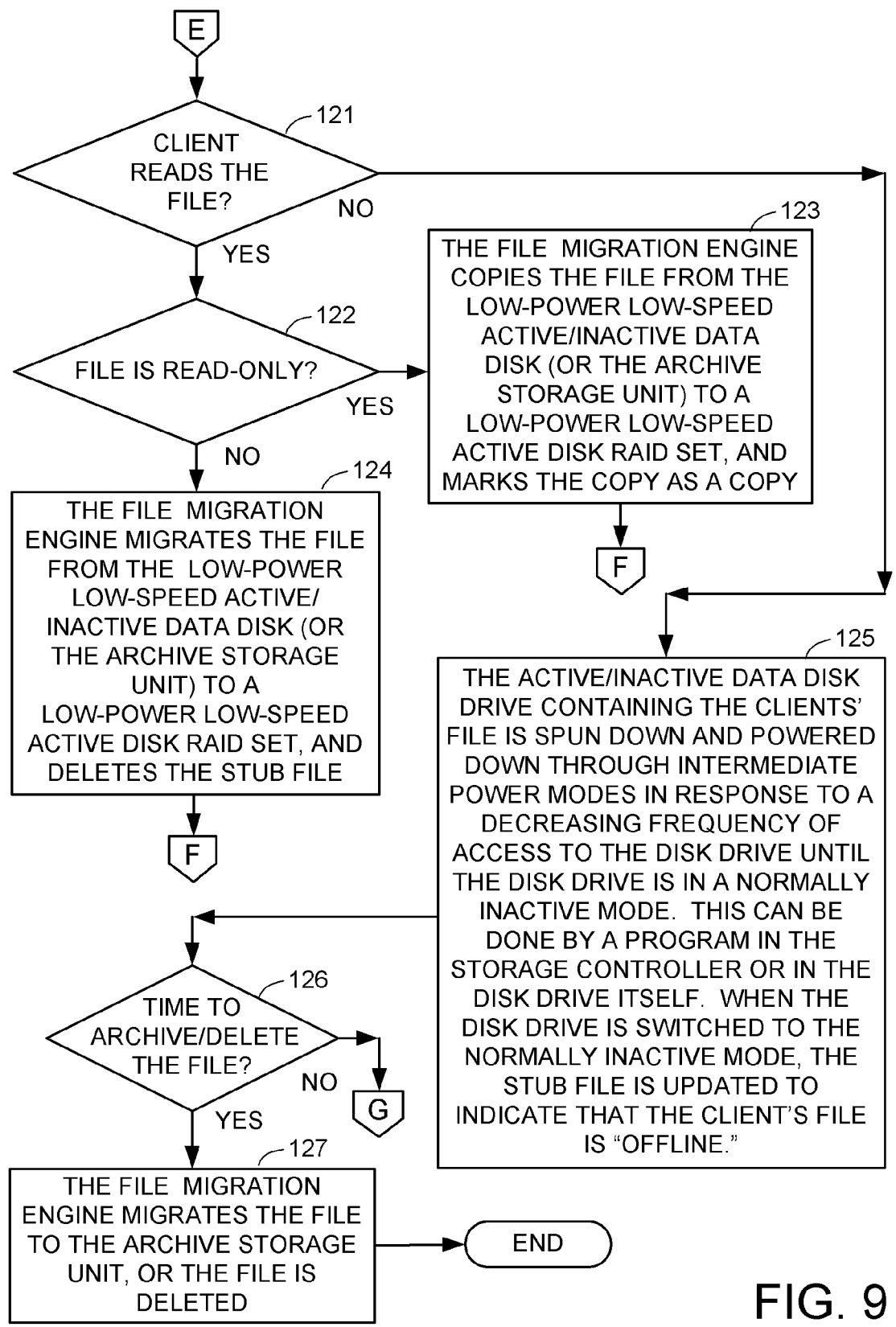

In step 116, if the client does not write to the file, then execution continues to step 121 of FIG. 9. In step 121, if the client reads the file, execution continues to step 122. In step 122, if the file has a "read-only" attribute set, then execution branches to step 123. Such a read-only file is not likely to be deleted from storage, and often is a retention protected file that should not be deleted. Therefore, in step 123, the file migration engine copies the client's file from the low-power low-speed active/inactive data disk (or the archival storage unit) to a high-power, high-speed active disk RAID set, and marks the copy as a copy, but does not remove the client's file from the low-power low-speed active/inactive data disk (or the archival storage unit). Execution loops from step 123 back to step 104 of FIG. 7.

In step 122, if the client's file is not read-only, then execution continues to step 124. In step 124, the file migration engine migrates the file from the low-power low-speed active/ inactive data disk (or from the archive storage unit) to a low-power low-speed active disk RAID set, and deletes the stub file. Execution loops from step 124 back to step 104 of FIG. 7.

In step 121, if the client does not read the file, then execution continues to step 125. In step 125, the active/inactive data disk drive containing the client's file is spun down and powered down through intermediate power modes in response to a decreasing frequency of access to the disk drive until the disk drive is in a normally inactive mode. This can be done by a program in the storage controller or in the disk drive itself. When the disk drive is switched to the normally inactive mode, the stub file is updated to indicate that the client's file has become "offline."

From step 125, execution continues to step 126. In step 126, if it is not yet time to archive or delete the file, then execution loops back to step 116 in FIG. 8. Otherwise, if it is time to archive or delete the file, then execution continues to step 127. In step 127, the file migration engine migrates the file to the archival storage unit. Because the files in each active/inactive mode disk drive have similar inactivity or expulsion times, the files in each active/inactive mode disk drive are archived in one or more batches from the disk drive to the archival storage unit. For each batch, the disk drive is powered up, spun up, the batch of files are migrated to the archival storage or deleted, and then the disk drive is powered down.

In step 127, a file is deleted, for example, if there is no requirement for the file to be archived, or if a remote copy of the file is available somewhere else, or if the file is a "read only" file and a copy of this "read only" file exists in one of the low-speed low-power disk RAID sets. After step 127, if the client's file has been archived, then the file remains in the archival storage unit until recalled in response to a client request to read from or write to the file.

If the price of disk drives continues to decrease relative to the cost of archival storage, there might not be any benefit to using an archival storage unit. For example, in an Internet server storing read-only web pages, any cost savings of archival storage over normally inactive disk storage might not be worth the additional delay of retrieving and mounting a cassette tape or CD ROM disk. In this case, there should be added a background process of reclaiming storage space of files that are promoted from the normally inactive disk storage. Such a background process of reclaiming storage may work from the head of the queue of active/inactive data disks (50 in FIG. 3) by migrating files from the oldest active/inactive data disk in the queue to released space from files promoted from younger active/inactive data disks in the queue so that the evacuated data disk can be removed from the queue and returned to the pool of evacuated active/inactive data disks (57 in FIG. 3).

Thus, in a hierarchical storage system having a queue of active/inactive data disks, two separate mechanisms could be used for data disk evacuation. A not yet inactive data disk drive could be evacuated for power saving by file migration from the not yet inactive data disk drive to released storage of files promoted from younger data disk drives in the queue. If the oldest data disk in the queue is not evacuated by file deletion or migration to an archival storage unit, then it would also be desirable evacuate the oldest data disk in the queue for storage reclamation by file migration from the oldest data disk in the queue to released storage from files promoted from younger data disk drives in the queue.

Figure 10:
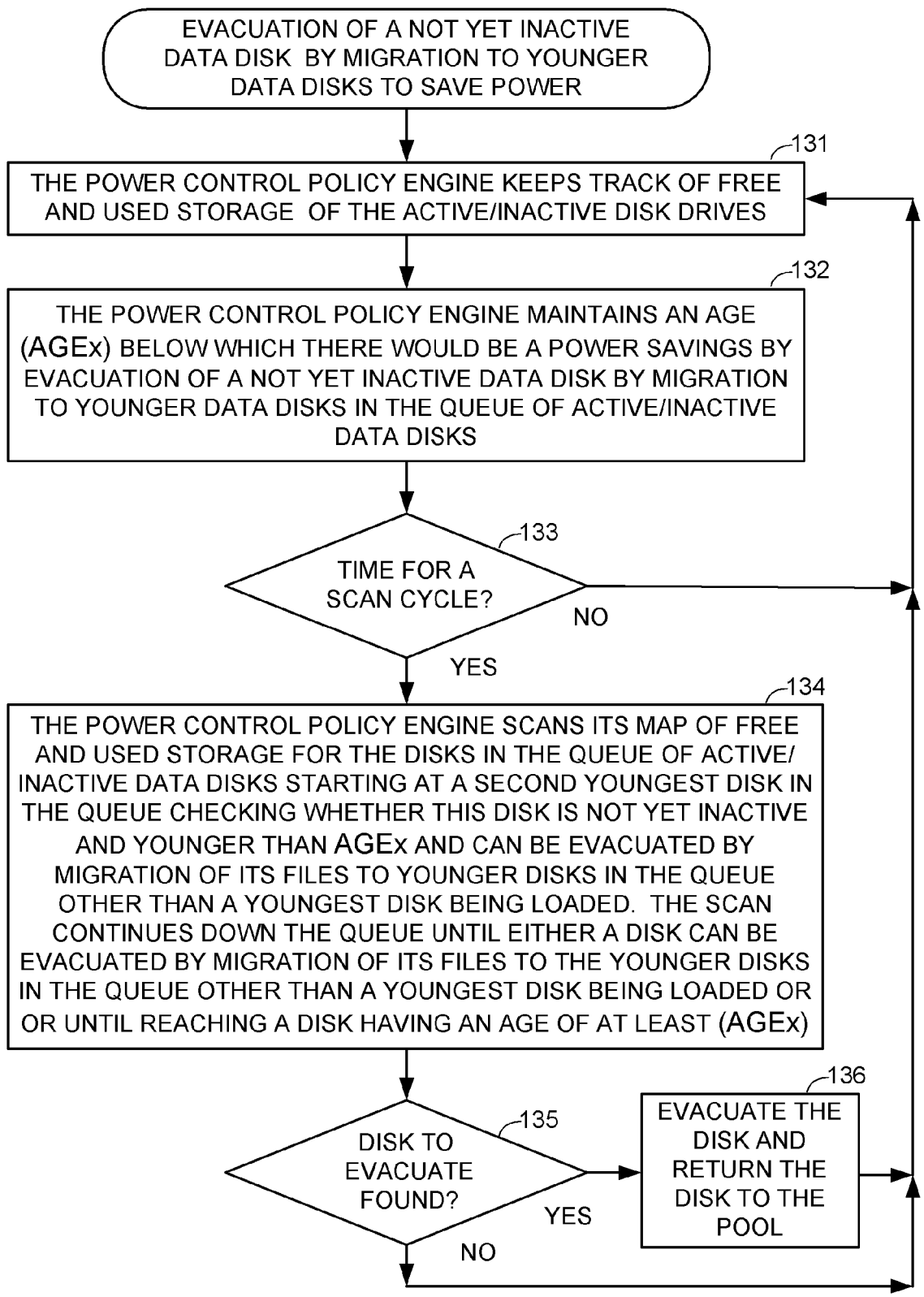
FIG. 10 is a flowchart showing how the power control policy engine is programmed to save power by evacuating a not yet inactive data disk by migration of files from the not yet inactive data disk to younger data disks.

FIG. 10 shows how the power control policy engine is programmed to save power by evacuating a not yet inactive data disk in the queue by migration of files from the not yet inactive data disk to released space of younger data disks in the queue. In a first step 131, the power control policy engine keeps track of free storage and used storage of the active/inactive disk drives. For example, the policy control engine maintains a map (204 in FIG. 15) of the used and unused storage capacity for each active/inactive data disk in the queue (50 in FIG. 3). This map is maintained in active storage, so that the power control policy engine does not need to access any inactive storage in order to plan, pre-allocate the unused storage capacity, and schedule a migration of files to the pre-allocated unused storage capacity.

In step 132, the power control policy engine maintains an age (AGEx) below which there would be a power savings by evacuation of a not yet inactive data disk by migration to released storage of younger data disks in the queue of active/inactive data disks. This age (AGEx) is estimated or computed as the difference between the average time that an active/inactive data disk becomes inactive after the inactive/inactive data disk is loaded, and the average time that it takes to perform the evacuation of a disk at this age.

The policy control engine repetitively performs a scan cycle to look in the queue for the youngest active/inactive data disk that is younger than "AGEx" and that can be evacuated by migration of its files to released storage of younger active/inactive data disks in the queue. For example, such a scan cycle is performed periodically as a background task and more frequently in response to the release of storage by file preemption from active/inactive data disks in the queue that are younger than "AGEx." When such a scan cycle is performed, the policy control engine determines an amount of free storage actually used or a minimum amount of free storage needed for evacuation of an active/inactive data disk younger than "AGEx" in the queue. Whenever substantially more than such an amount of free storage becomes available by file preemption from the queue, another scan cycle can be preformed with a high degree of certainty of finding an active/inactive data disk suitable for evacuation for power savings.

In step 133, if it is not time for a scan cycle, then execution loops back to step 131. Otherwise, if it is time for a scan cycle, then execution continues from step 133 to step 134. In step 134, the power control policy engine scans its record of free and used storage for the disks in the queue of active/inactive data disks starting at the second younger disk in the queue and checking whether this data disk can be evacuated by migration of its files to younger data disks in the queue other than a youngest data disk being loaded. The scan continues down the queue until either a disk is found that can be evacuated by migration of its files to the younger disks in the queue other than a youngest data disk being loaded or until reaching a disk having an age of at least "AGEx." In step 135, if such a disk to evacuate is not found, then execution loops back to step 133. Otherwise if such a disk to evacuate is found, then execution continues to step 136 to evacuate the disk and return the disk to the pool of evacuated disks (57 in FIG. 3), so that the disk becomes inactive for power saving, and execution returns to step 131. Normally, the disk evacuated in step 136 is not re-used until the other data disks in its RAID set have also been evacuated and returned to the pool of evacuated disks.

Figure 11:
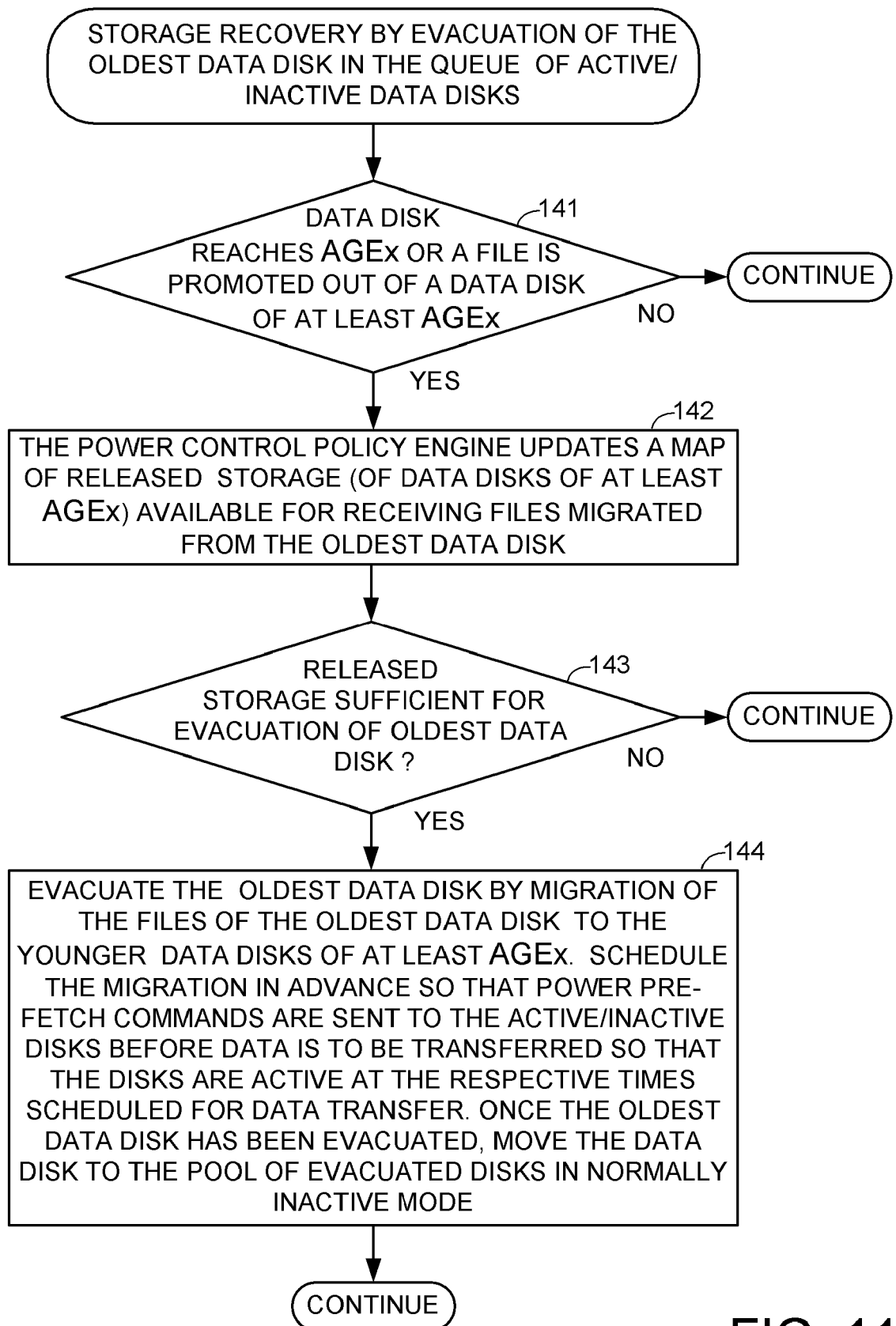
FIG. 11 is a flowchart showing how the power control policy engine is programmed to recover storage by migrating files from an oldest data disk to younger data disks.

FIG. 11 shows how the power control policy engine is programmed to recover storage by migrating files from an oldest data disk to younger data disks in the queue. In a hierarchical storage system in which a not yet inactive data disk younger than "AGEx" could be evacuated for power savings, the files migrated from the oldest data disk are not migrated to data disks younger than "AGEx" so as not to compete with this mechanism for power savings. In step 141, when a data disk in the queue (50 in FIG. 3) reaches "AGEx" or when a file is promoted out of a data disk of at least "AGEx," execution continues to step 142. In step 142, the power control policy engine updates a map of released storage (in the data disks of at least "AGEx" in the queue) available for receiving files migrated from the oldest data disk in the queue. In step 143, if this amount of released storage is sufficient for evacuation of the oldest data disk in the queue, then execution continues to step 144. In step 144, the oldest data disk in the queue is evacuated by migration of the files of the oldest data disk to the younger data disks of at least "AGEx" in the queue. The power control engine schedules the migration in advance so that power-prefetch commands are sent to the active/inactive disks before data is to be transferred. The power-prefetch commands ensure that the disks are active at the respective times scheduled for data transfer. Once the oldest data disk in the queue has been evacuated, the data disk is removed from the queue and put in the pool of evacuated active/inactive disks.

It should be understood that the storage recovery procedures in FIGS. 10 and 11 avoid unnecessary migration of files from one data disk in the queue to another data disk in the queue. The storage recovery procedures in FIGS. 10 and 11, however, may cause the order of the files in the queue to become different from the order in which the files were loaded into the queue. This change in the order of the files in the queue does not significantly interfere with power savings because the movement of older files to younger data disks in the queue tends to make the frequency of access to the younger data disks more predictable. For the archiving of files or for other purposes, however, it may be desirable to keep the order of the files in the queue substantially the same as the order in which the files were loaded into the queue. It is possible to recover storage under this constraint without substantial interference with power savings by modifying the storage recovery techniques of FIGS. 10 and 11 so that a not-yet inactive data disk is evacuated by migrating files from the not-yet inactive data disk to only a next youngest data disk in the queue, and so that an inactive data disk is evacuated by migrating files from the inactive data disk only to the next youngest data disk or a next oldest data disk in the queue.

The storage controller (26 in FIG. 1) or each active/inactive disk drive responds to a power pre-fetch command by bringing the disk drive to the active state at the requested time in such a way as to minimize power. Thus, a disk drive in an inactive mode will spin-up beginning at a time and in such a way (e.g., slow or fast angular acceleration) as to minimize the power required to be fully active at the time specified in the power pre-fetch command.

Figure 12:
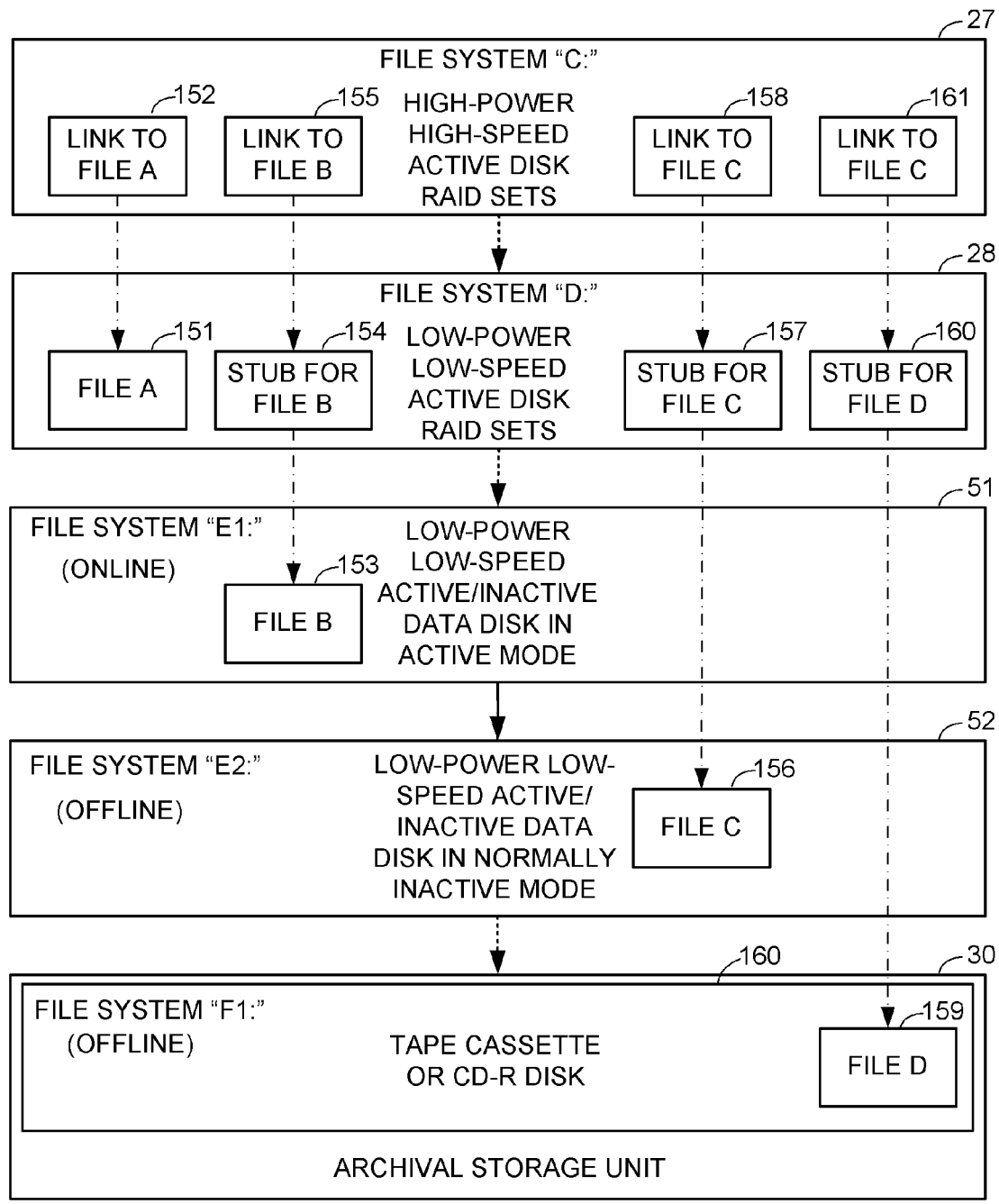
FIG. 12 is a block diagram of a meta file system of file system cells including link and stub files in the storage hierarchy of the hierarchical storage system of FIG. 1.

FIG. 12 shows a meta file system of file system cells including link and stub files in the storage hierarchy of the hierarchical storage system of FIG. 1. Each level in the storage hierarchy is organized as a separate file system, forming a cell in a meta file system appearing to a normal client (i.e., not a privileged client such as a system administrator) as a single file system. Thus, the files in the high-power high-speed active disk RAID sets 27 are organized into a file system "C:", the files in the low-power low-speed active disk RAID sets 28 are organized into a file system "D:", the files in the low-power low-speed active/inactive data disk 51 are organized into a file system "E1:", the files in the low-power low-speed active/inactive data disk 52 are organized into a file system "E2:", and the files in a tape cassette or CD-R disk 160 in the archival storage unit 30 are organized into a file system "F1:".

When a file 151 (File A) is migrated from the file system "C:" of the high-power high-speed active disk RAID sets 27 to the file system "D:" of the low-power low-speed active disk RAID sets 28, a link 152 to the file 151 is placed in the file system "C:".

When a file 153 (File B) was migrated from the file system "C:" of the high-power high-speed active disk RAID sets 27 to the file system "D:" of the low-power low-speed active disk RAID sets 28, a link 155 to the file 153 was placed in the file system "C:". When the file 153 is expelled from the file system "D:" and put in the file system "E1:" of the active/inactive data disk 51, a stub file 154 pointing to the file 53 is kept in the file system "D:".

In a similar fashion, when a file 156 (File C) was migrated from the file system "C:" of the high-power high-speed active disk RAID sets 27 to the file system "D:" of the low-power low-speed active disk RAID sets 28, a link 158 to the file 156 was placed in the file system "C:". When the file 156 was expelled from the file system "D:" and put in the file system "E2:" of the active/inactive data disk 52, a stub file 157 pointing to the file 156 was kept in the file system "D:".

In a similar fashion, when a file 159 (File D) was migrated from the file system "C:" of the high-power high-speed active disk RAID sets 27 to the file system "D:" of the low-power low-speed active disk RAID sets 28, a link 161 to the file 159 was placed in the file system "C:". When the file 159 was expelled from the file system "D:" a stub file 160 pointing to the file 159 was kept in the file system "D:". When the file 159 was archived to the tape cassette or CD-R disk 160 in the archival storage unit 30, the stub file 154 was updated to point to the file 159 in a file system "F1:" of the tape cassette or CD-R disk 160.

Figure 13:
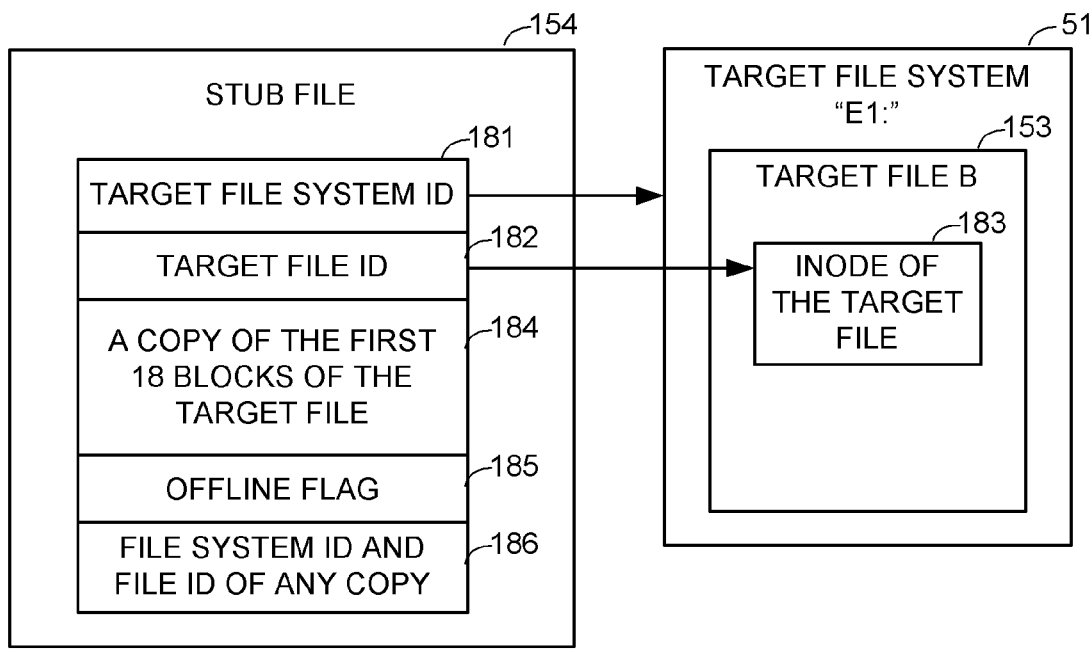
FIG. 13 is a block diagram of a stub file in the storage hierarchy of the hierarchical storage system of FIG. 1.
Figure 14:
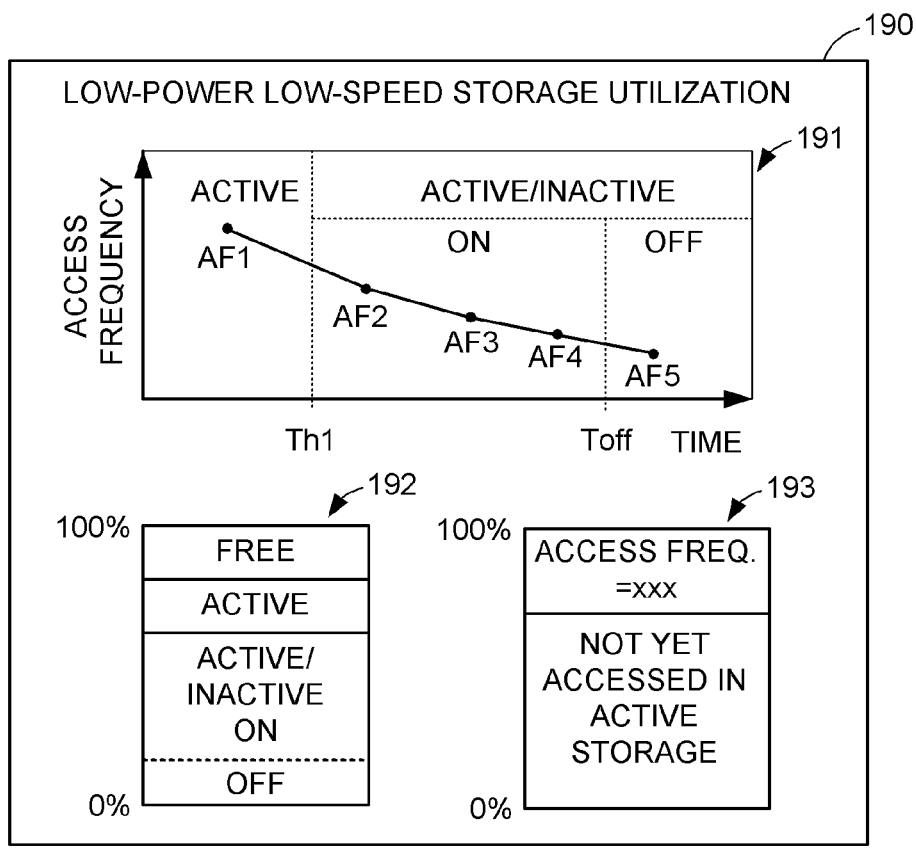
FIG. 14 shows a display screen for a system administrator of the hierarchical storage system of FIG. 1.

FIG. 13 shows a preferred organization of the stub file 154 in the storage hierarchy of FIG. 12. The stub file 154 includes a file system ID 181 of the target file system 51 named "E1:". The stub file 154 also includes a file ID 182 of the target file 153. The stub file 154 also includes a copy 184 of the first eighteen blocks of the target file 153. Therefore, a file system operation requiring attributes of the target file 153 may fetch the attributes from the stub file 154, and a file system operation of the target file 153 may begin by reading the bocks 184 from the stub file while the target file system 51 is being accessed.

The stub file 154 includes an offline flag 185 indicating whether or not the target file system 51 is offline because it is in an inactive data disk or because it is in a tape cassette or in a CD-R disk that is not yet mounted in the archival storage unit. If the offline flag is set, then the file system manager (38 in FIG. 1) will treat the target file system as if it were an unmounted file system, instead of returning a delayed error message or causing termination of a session after a timeout interval. Thus, a network client can be notified immediately of an offline status, and the client could have the option of cancelling an access request.

The stub file 154 may also include the file system ID and file ID of any copy of the target file 153, or an indication that there is no copy. As noted above, if the target file 153 is a read-only file, then a copy of the target file 153 may reside in a low-power low-speed active disk RAID set. If the stub file 154 indicates a file system ID and file ID of a copy, then for a read access, the copy is accessed instead of the target file 153.

The hierarchical storage system as described above is especially adapted for a normal popularity and life-cycle model for client access to files in the hierarchical storage. To maintain a high level of performance, it is desirable to convey to the system administrator a picture 190 of the low-power low-speed storage utilization. Abnormal utilization of the low-power low-speed storage utilization may give advance warning of an impending loss of performance due to abnormal client demand, for example, due to an unauthorized scan or copy of the files in the hierarchical storage.

The power control policy engine (46 in FIG. 1) provides the system administrator (48 in FIG. 1) with a graphical display 190 including a graph 191 of the access frequency versus time for the files in the low-power low-speed storage (disk RAID sets 28 and 29 in FIG. 1). This graph 191 is constructed from the average frequency (AF1) of access of a file in the low-power low-speed active disk RAID sets 28, and from the average frequency of access (AF2, AF3, AF4, AF5, etc.) of each of the active/inactive data disks in the queue (50 in FIG. 3), and the average age of the files in the low-power low-speed active disk RAID sets 28 and in each of the active/inactive data disks in the queue. Thus, the average frequency of access (AF1) of a file in the low-power low-speed active disk RAID sets 28 is position at a time of one-half of the expulsion threshold time (Th1), and the average frequency of access of a file in each of the active/inactive data disks in the queue is plotted at a time of the expulsion threshold time (Th1) plus the time elapsed since the data disk was loaded. Also indicated on the graph is the expulsion threshold time (Th1) and the average time (Toff) at which the active/inactive disks transition to their normally inactive mode.

The graphical display 190 further includes a chart 192 showing the various percentages of the low-power low-speed storage that is free, active, active/inactive, and active/inactive "on" and active/inactive "off." The storage that is active/inactive "off" is the active/inactive storage that is in the normally inactive state.

The graphical display 190 also includes a chart 193 indicating the percentage of files in the low-power low-speed active disk RAID sets (28 in FIG. 1) that has not yet been accessed in the low-power low-speed active disk RAID sets, and the average access frequency for the files in the low-power low-speed active disk RAID sets that have been accessed in the low-power low-speed storage.

Figure 15:
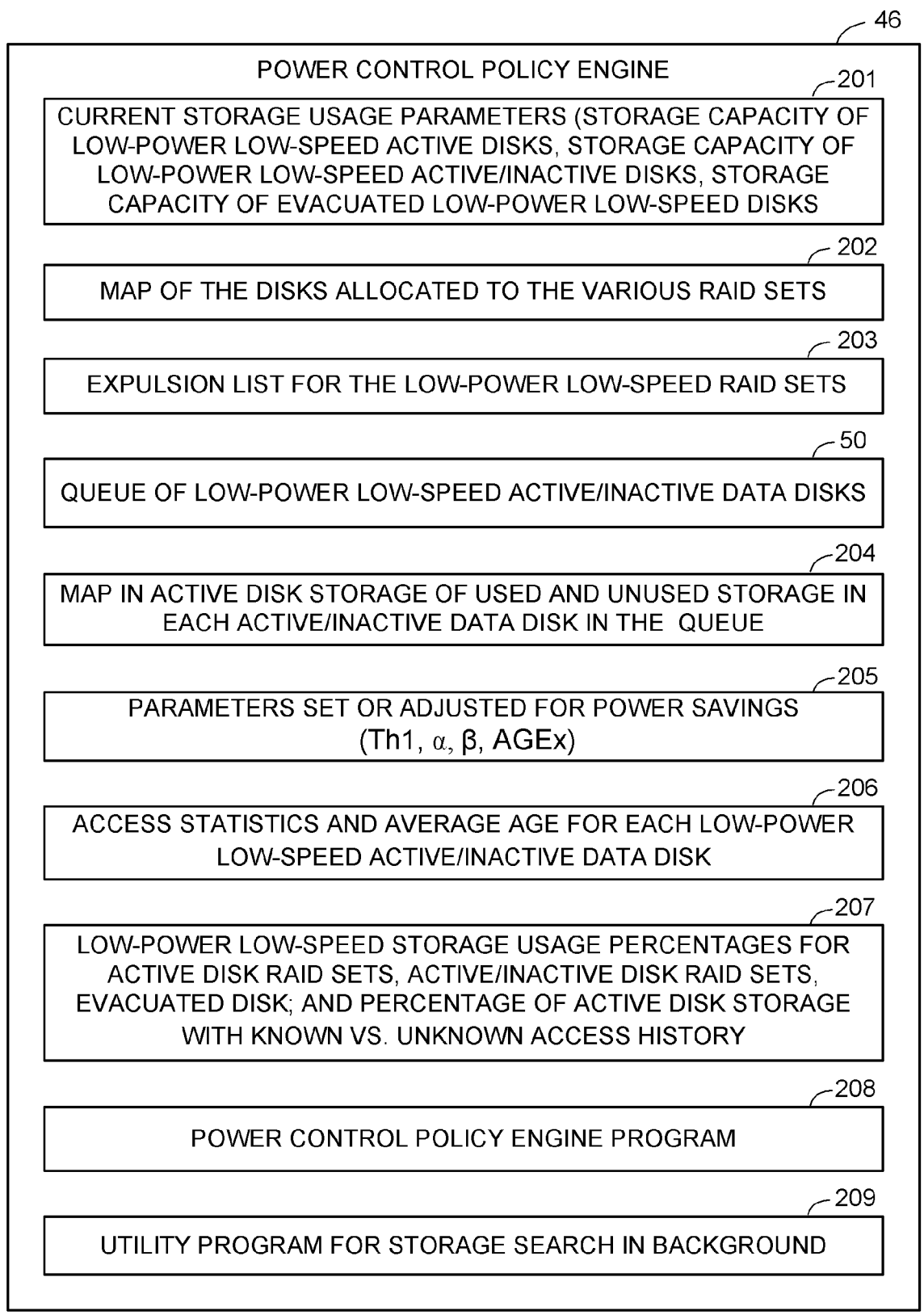
FIG. 15 is a block diagram of the power control policy engine in the hierarchical storage system of FIG. 1.

FIG. 15 shows a block diagram of the power control policy engine 46 in the hierarchical storage system of FIG. 1. The power control policy engine 46 maintains a database 201 of current storage usage parameters, such as the storage capacity of the low-power low-speed active data disks, the storage capacity of low-power low-speed active/inactive data disks in the queue, and the storage capacity of the evacuated low-power low-speed active/inactive data disks in the pool of evacuated disks. The power control policy engine 46 also maintains a map 202 of the disks allocated to each of the low-power low-speed RAID sets 28, 29, an expulsion list 203 for the low-power low-speed active disk RAID sets (28 in FIG. 1), the queue 50 of low-power low-speed active/inactive data disks, and a map 204 in active disk storage of used and unused storage capacity for each active/inactive data disk in the queue.

The power control policy engine 46 maintains the parameters 205 (Th1, α, β, AGEx) that are set or adjusted for power savings, and computes and records access statistics and an average age 206 for each low-power low-speed active/inactive data disk. The power control policy engine 46 also computes and records low-power low-speed storage usage percentages of the active disk RAID sets (28 in FIG. 1), the active/inactive disk RAID sets (29 in FIG. 1), the evacuated disk, and the percentage of active disk storage with known versus unknown access history. The power control policy engine 46 also includes the power control policy engine program 28, which operates as described above with reference to the flowcharts of FIGS. 6 to 11. Finally, the power control policy engine includes a utility program 209 for searching the low-power low-speed active/inactive data disks in a background mode.

Figures 16, 17:
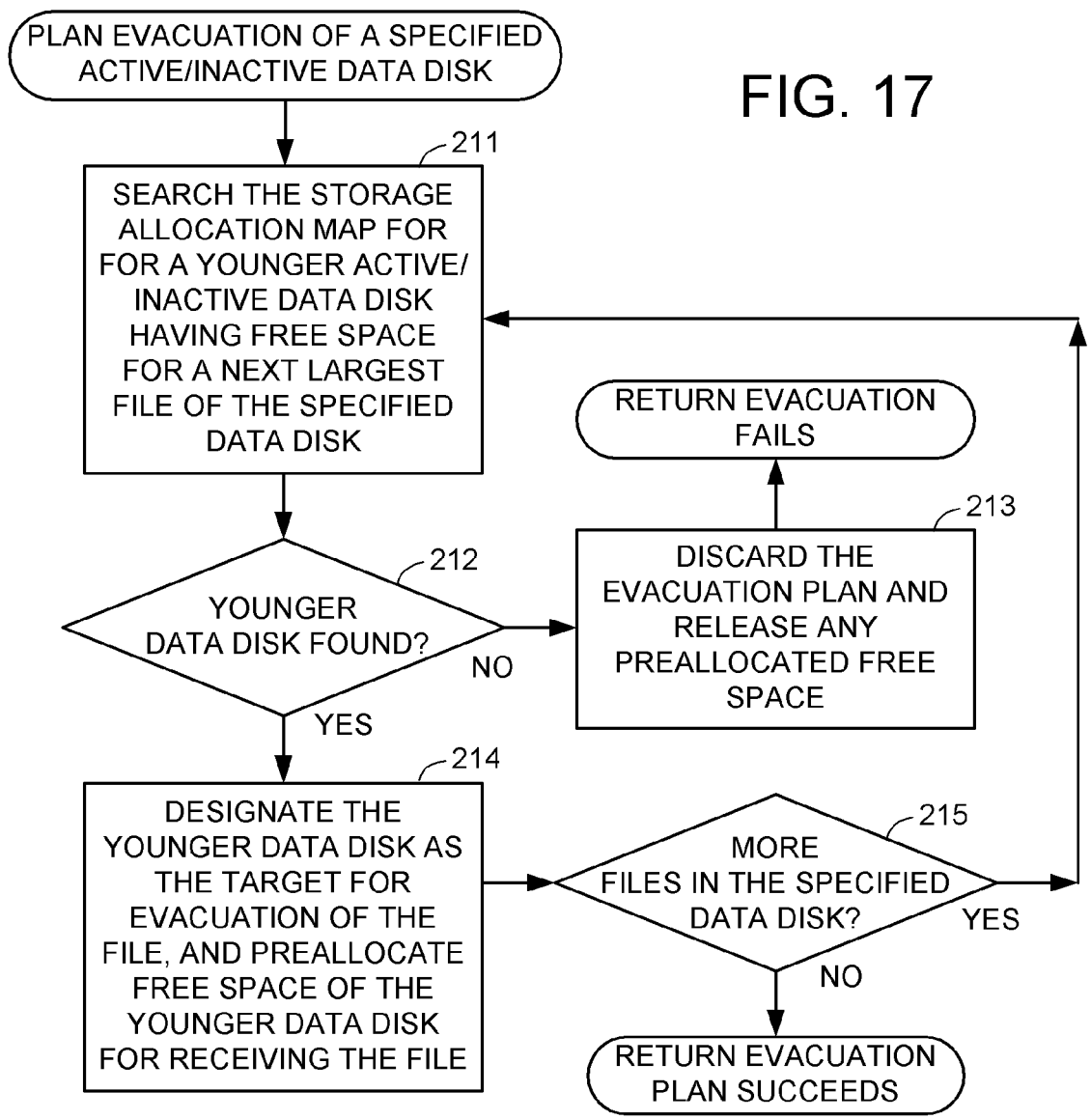
FIG. 16 shows a map of used and unused storage in the active/inactive data disks in the queue of FIG. 3.
FIG. 17 is a flowchart of a subroutine for scanning the map of FIG. 16 for planning evacuation of a specified one of the active/inactive data disks in the queue of FIG. 3.

FIG. 16 shows a specific example of the map 204 of used and unused storage in each active/inactive data disk in the queue. For each active/inactive data disk in the queue, the map 204 includes the number of file system blocks of free space, and a list of the file sizes of the files on the data disk. For example, for each file, the map 204 also includes the file ID of the file in the file system of the data disk, and the file ID of the corresponding stub file. Therefore, evacuation of a source disk can be planned in advance by accessing only the map 204 (and not the source disk or target disks) to find a respective target disk having a sufficient number of free file system blocks for each file on the source disk. The search process can be facilitated by keeping the list of the files on each data disk sorted in descending order of file size.

FIG. 17 shows a subroutine for planning evacuation of a specified one of the active/inactive data disks in the queue (50 in FIG. 3). In a first step 211, the power control policy engine searches the storage allocation map for a younger active/inactive data disk having free space for a next largest file of the specified data disk. In step 212, if such a younger data disk is not found, then execution branches to step 213 to discard the evacuation plan and to release the preallocated free space. After step 213, execution returns with a return code indicating that evacuation fails.

In step 212, if such a younger data disk is found, then execution continues to step 214. In step 214, the younger data disk is designated as the target for evacuation of the file, and free space of the younger disk is preallocated for receiving the file. In step 215, if there are not any more files in the specified disk, then execution returns with a successful evacuation plan for the specified disk. This evacuation plan includes a respective target data disk for each file in the specified data disk. Thus, the power control policy engine can execute the plan by commanding the migration engine to migrate each file on the specified data disk to its respective target data disk. The storage allocation map provides the file ID of each source file on the specified disk, and also provides the stub file ID of the corresponding stub file in the file system ("D:") of the low-power low-speed active/inactive data disks in active mode. Once a file is migrated from the specified data disk to the target data disk, the power control policy engine updates the corresponding stub file to indicate the file system ID and file ID of the new target location of the file.

In step 215, if there are more files in the specified data disk, then execution loops back to step 211 to search the storage allocation map for a younger data disk having sufficient free space for a next largest file of the specified data disk. The free space available for the next largest file of the specified data disk is the original amount of free space of the younger data disk in the storage allocation map less any amount of this free space of the younger data disk that has already been preallocated (in step 214) for evacuation of the specified data disk.

In step 212, if such a younger data disk is not found, then the next largest file of the specified data disk cannot be migrated to a younger data disk, and execution branches to step 213 to discard the evacuation plan and release the preallocated free space. Execution returns from the subroutine with an error code indicating that evacuation fails.

Figure 18:
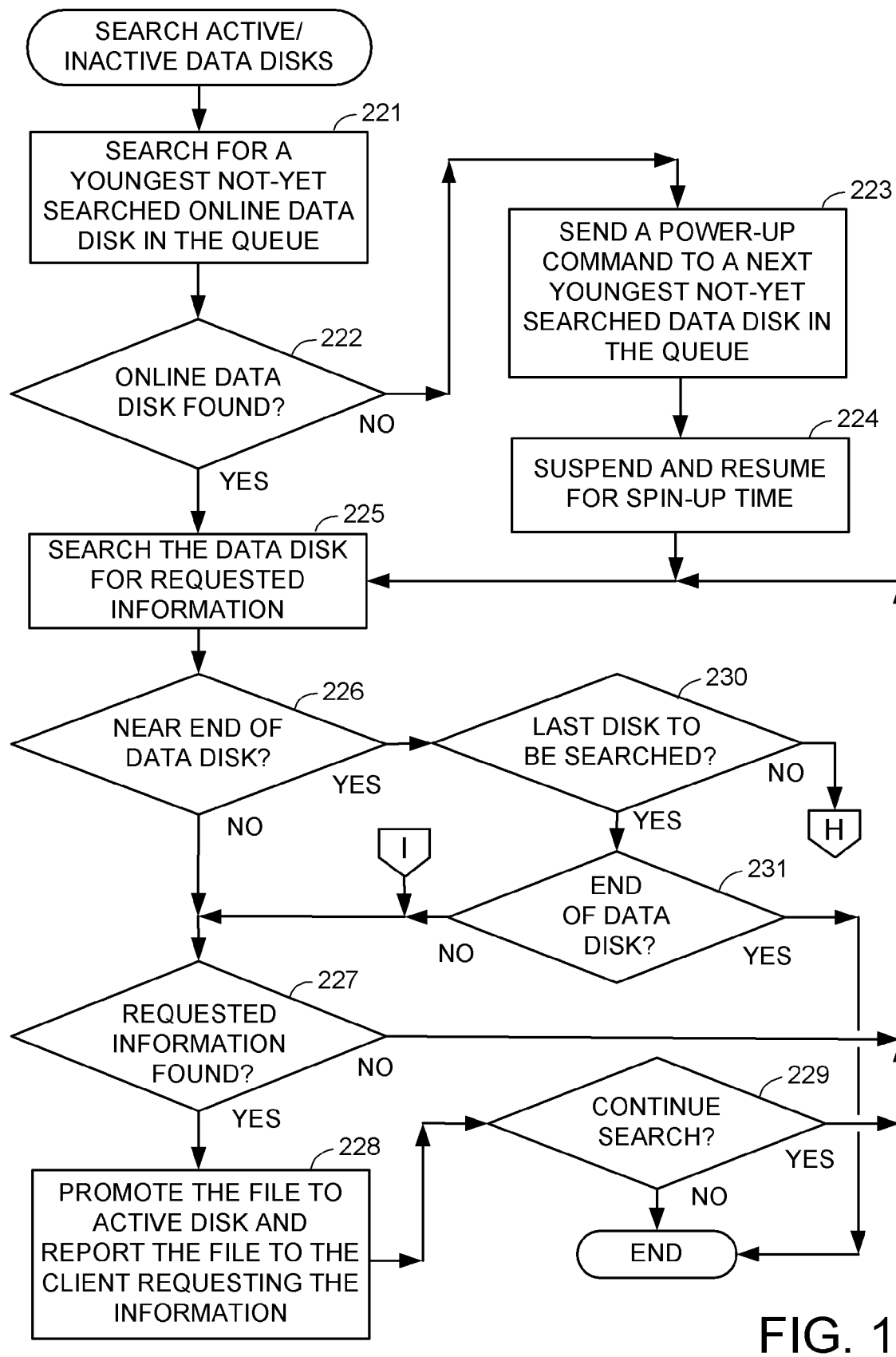
FIGS. 18 and 19 together comprise a flowchart of a utility program for searching the low-power low-speed active/inactive data disks in the hierarchical storage system of FIG. 1.
Figure 19:
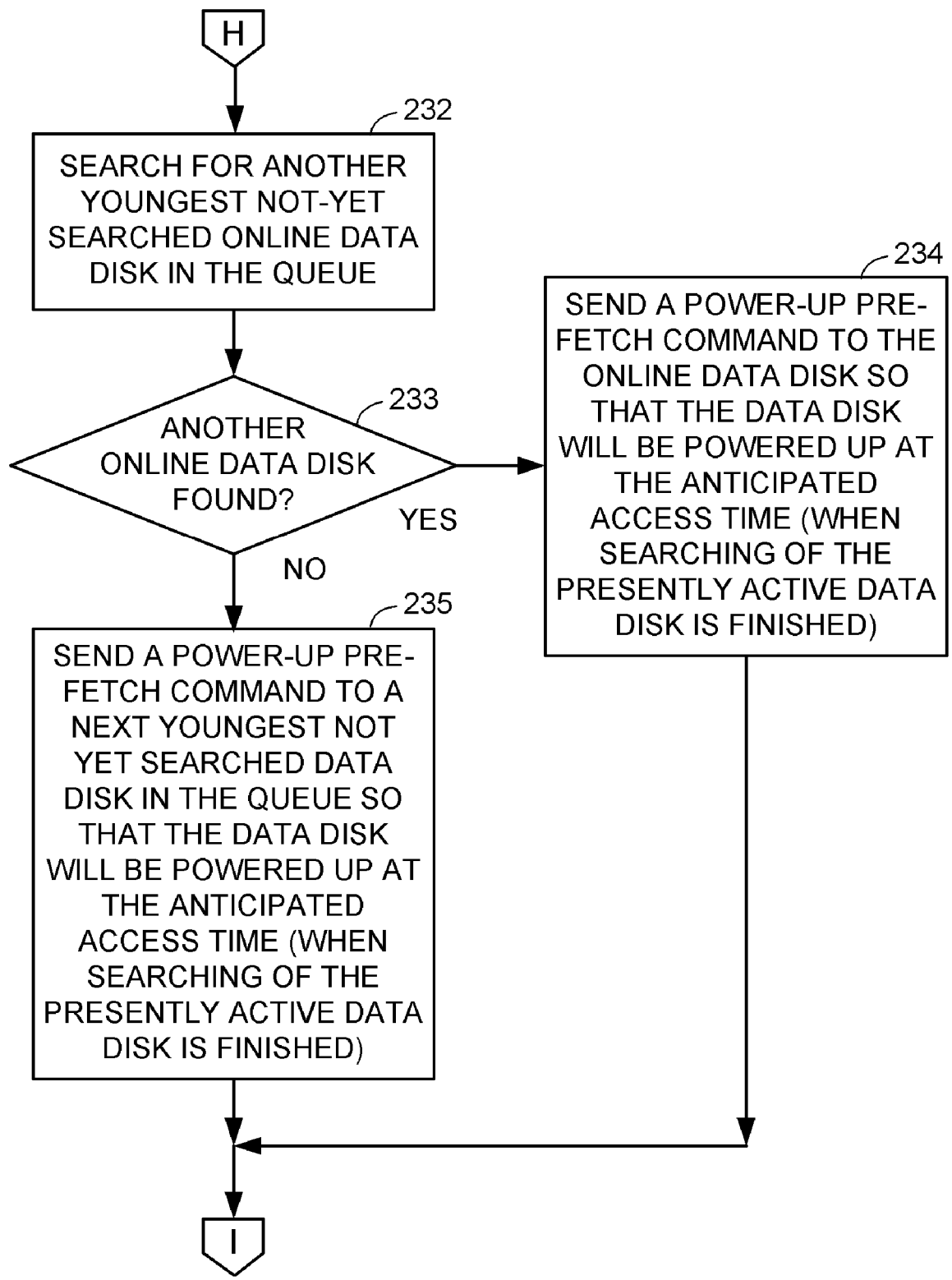

FIGS. 18-19 show operation of the utility program (209 in FIG. 15) for searching the low-power low-speed active/inactive data disks in background mode. This search is performed so as to reduce power consumption and prevent preemption of a file when the file does not contain information that satisfies a specified search criterion. In a first step 221, the utility program searches for a youngest non-yet searched online data disk in the queue. In step 222, if an online data disk is not found in the queue, then execution branches to step 223 to send a power-up request to a next youngest not-yet searched data disk in the queue. In step 224, the utility program suspends and resumes execution for the spin-up time of the data disk, and execution continues to step 225. Execution also continues to step 225 from step 222 if a not-yet searched online data disk is found.

In step 225, the data disk is searched for requested information. This is done by reading files on the data disk, but a file is not promoted unless requested information is found in the file. During the search, in step 226, if the search is not near the end of the data disk, then execution continues to step 227. If the requested information is found, then execution continues from step 227 to step 228, to promote the file to active disk and report the file to the client or application requesting the information. In step 229, if the search is not to be continued (e.g., the request would be satisfied by returning just a first file found matching the search criterion), then the search is finished. Otherwise, if the search is to be continued (for finding all files matching the search criterion), then execution loops back to step 225 to continue the search. Execution also loops from step 227 back to step 225 if the requested information has not yet been found, in order to continue the search until the search becomes near the end of the data disk or until the requested information is found.

If the search becomes near the end of the data disk, then execution branches from step 226 to step 230. If the data disk is the last data disk to be searched, then execution continues to step 231. In step 231, if the end of the data disk has been reached, then the search is finished. In step 231, if the end of the data disk has not been reached, then execution branches to step 227 to continue the search.

In step 230, if the data disk is not the last disk to be searched, then execution branches from step 230 to step 232 in FIG. 19. In step 232, the utility program searches for another youngest not-yet searched online data disk in the queue. In step 233, if another online data disk is found, then execution branches to step 234. In step 234, a power-up prefetch command is sent to the online data disk so that the online data disk will be powered up at the anticipated access time (when searching of the presently active data disk is finished). Execution continues from step 234 to step 227 of FIG. 18.

In step 233, if another online data disk is not found, then execution continues to step 235. In step 235, a power-up prefetch command is sent to a next youngest not yet searched data disk in the queue so that the data disk will be powered up at the anticipated access time (when searching of the presently active data disk is finished).

In view of the above, there has been described a method of power savings in a file server including active storage containing frequently accessed files, and active/inactive disk drives for containing infrequently accessed files. Groups of the files having become inactive in the active storage are successively migrated to respective evacuated active/inactive disk drives so that each active/inactive disk drive is loaded with files having a similar probability of access when access to the active/inactive disk drive reaches an inactivity threshold for powering down the active/inactive disk drive. Storage of the active/inactive disk drives is reclaimed when an oldest group of the files is archived or when an active/inactive disk drive is evacuated by migrating files from the active/inactive disk drive to storage having been released in other disk drives by promotion of files for client access to the promoted files. Therefore, recovery of the active/inactive disk drive storage is decoupled from the process of migration of inactive files from the active storage to the active/inactive disk drives and the process of file promotion so that the recovery of the active/inactive disk drive storage can be planned and scheduled in advance and performed efficiently in a background process. For example, a not yet inactive disk drive is evacuated by migrating its files to released storage in younger active/inactive disk drives if this will result in a power savings, or the oldest active/inactive disk drive is evacuated by migrating its files to released storage in the younger active/inactive disk drives.

What is claimed is:

1. A method of operating a file server for power savings, the file server including active storage containing frequently accessed files, and active/inactive disk drives for containing infrequently accessed files, said method comprising:
   (a) successively migrating groups of the files from the active storage to respective evacuated ones of the active/inactive disk drives, the files in each group of files being migrated when the files in said each group of files become inactive in the active storage, wherein the files in said each group of files are selected to have a similar probability of access when access to the active/inactive disk drive containing said each group of files reaches an inactivity threshold for powering down the active/inactive disk drive containing said each group of files; and
   (b) powering down the disk drive containing said each group of files when access to the active/inactive disk drive containing said each groups of files reaches the inactivity threshold for powering down the active/inactive disk drive containing said each group of files;
   wherein said method further includes computing a respective expulsion time for each of the files in the active storage, the respective expulsion time specifying when said each of the files in the active storage should be migrated from the active storage to one of the active/inactive disk drives for power savings, and placing said each of the files in the active storage on an expulsion list ordered by the respective expulsion time, and at the respective expulsion times, successively migrating the files in each group of the files from the expulsion list to the active/inactive disk drive for containing said each group of files.

2. The method as claimed in claim 1, wherein the active storage includes at least a first level of relatively high-speed active storage and a second level of relatively low-speed active storage, and wherein the method further includes migrating the files from the first level of relatively high-speed active storage to the second level of relatively low-speed active storage based on inactivity of access to the files in the first level of relatively high-speed storage, and wherein files having been accessed after migration to the second level of relatively low-speed active storage require a greater time of access inactivity in the second level of relatively low-speed storage for migration to one of the active/inactive disk drives than files that have not been accessed after migration to the second level of relatively low-speed active storage.

3. A method of operating a file server for power savings, the file server including active storage containing frequently accessed files, and active/inactive disk drives for containing infrequently accessed files, said method comprising:
   (a) successively migrating groups of the files from the active storage to respective evacuated ones of the active/inactive disk drives, the files in each group of files being when the files in said each group of files become inactive in the active storage, wherein the files in said each group of files are selected to have a similar probability of access when access to the active/inactive disk drive containing said each group of files reaches an inactivity threshold for powering down the active/inactive disk drive containing said each group of files; and
   (b) powering down the disk drive containing said each group of files when access to the active/inactive disk drive containing said each group of files reaches the inactivity threshold for powering down the active/inactive disk drive containing said each group of files;
   wherein said method further includes maintaining the active/inactive disk drives containing the groups of files in a queue, the respective evacuated one of the active/inactive disk drives becoming a youngest one of the active/inactive disk drives on the queue once each group of files is migrated from the active storage to the respective evacuated one of the active/inactive disk drives, and successively evacuating files from an oldest active/inactive one of the disk drives from the queue, and taking the respective active/inactive disk drive becoming a youngest one of the disk drives in the queue from a pool of evacuated disk drives, and returning the oldest active/inactive disk drive from the queue to the pool of evacuated disk drives once the oldest active/inactive disk drive from the queue has been evacuated.

4. The method as claimed in claim 3, which further includes evacuating files from the oldest active/inactive one of the disk drives from the queue by migrating the files from the oldest active/inactive one of the disk drives from the queue to an archival storage unit.

5. The method as claimed in claim 3, which further includes promoting a plurality of files from the active/inactive disk drives in the queue to the active storage and releasing storage of the plurality of files from the active/inactive disk drives in the queue in response to client requests for access to the plurality of files, and evacuating files from the oldest active/inactive one of the disk drives from the queue by migrating files from the oldest active/inactive one of the disk drives from the queue to the released storage of at least some of the plurality of files.

6. The method as claimed in claim 3, which further includes promoting a plurality of files from the active/inactive disk drives in the queue to the active storage and releasing storage of the plurality of files from the active/inactive disk drives in the queue in response to client requests for access to the plurality of files, and evacuating a not yet inactive one of the active/inactive disk drives in the queue in order to save power by migrating files from the not yet inactive one of the active/inactive disk drives in the queue to the released storage of at least some of the plurality of files.

7. A method of operating a file server for power savings, the file server including active storage containing frequently accessed files, and active/inactive disk drives for containing infrequently accessed files, said method comprising:
   (a) successively migrating groups of the files from the active storage to respective evacuated ones of the active/inactive disk drives, the files in each group of files being migrated when the files in said each group of files become inactive in the active storage, wherein the files in said each group of files are selected to have a similar probability of access when access to the active/inactive disk drive containing said each group of files reaches an inactivity threshold for powering down the active/inactive disk drive containing said each group of files; and
   (b) powering down the disk drive containing said each group of files when access to the active/inactive disk drive containing said each group of files reaches the inactivity threshold for powering down the active/inactive disk drive containing said each group of files;

wherein said method further includes maintaining a map in the active storage of used and unused storage in each active/inactive disk drive containing files, and accessing the map to plan for evacuation of at least one active/inactive disk drive by file migration from said at least one active/inactive disk drive in the queue to unused storage of at least one other active/inactive disk drive.

8. A method of operating a file server for power savings, the file server including active storage containing frequently accessed files, and active/inactive disk drives for containing infrequently accessed files, said method comprising:
 (a) successively migrating groups of the files from the active storage to respective evacuated ones of the active/inactive disk drives, the files in each group of files being migrated when the files in said each group of files become inactive in the active storage, wherein the files in said each group of files are selected to have a similar probability of access when access to the active/inactive disk drive containing said each group of files reaches an inactivity threshold for powering down the active/inactive disk drive containing said each group of files; and
 (b) powering down the disk drive containing said each group of files when access to the active/inactive disk drive containing said each group of files reaches the inactivity threshold for powering down the active/inactive disk drive containing said each group of files;
 wherein said method further includes creating a respective stub file in the active storage pointing to each file in each of the active/inactive disk drives when said each file is migrated from the active storage to said each of the active/inactive disk drives, the stub file including a copy of multiple ones of the first blocks of said each file in said each of the active/inactive disk drives.

9. A method of operating a file server for power savings, the file server including active storage containing frequently accessed files, and active/inactive disk drives for containing infrequently accessed files, said method comprising:
 (a) successively migrating groups of the files from the active storage to respective evacuated ones of the active/inactive disk drives, the files in each group of files being migrated when the files in said each group of files become inactive in the active storage, wherein the files in said each group of files are selected to have a similar probability of access when access to the active/inactive disk drive containing said each group of files reaches an inactivity threshold for powering down the active/inactive disk drive containing said each group of files; and
 (b) powering down the disk drive containing said each groups of files when access to the active/inactive disk drive containing said each group of files reaches the inactivity threshold for powering down the active/inactive disk drive containing said each group of files;
 wherein said method further includes creating a respective stub file in the active storage pointing to each file in each of the active/inactive disk drives when said each file is migrated from the active storage to said each of the active/inactive disk drives, the stub file including an offline flag, the offline flag indicating whether or not said each of the active/inactive disk drives is in an inactive mode.

10. A method of operating a file server for power savings, the file server including active storage containing frequently accessed files, and active/inactive disk drives for containing infrequently accessed files, said method comprising:
 (a) successively migrating groups of the files from the active storage to respective evacuated ones of the active/inactive disk drives, the files in each group of files being migrated when the files in said each group of files become inactive in the active storage, wherein the files in said each group of files are selected to have a similar probability of access when access to the active/inactive disk drive containing said each group of files reaches an inactivity threshold for powering down the active/inactive disk drive containing said each group of files; and
 (b) powering down the disk drive containing said each groups of files when access to the active/inactive disk drive containing said each group of files reaches the inactivity threshold for powering down the active/inactive disk drive containing said each group of files;
 wherein at least one file in at least one of the active/inactive disk drives is a read-only file, and the method further includes responding to a client request to read said at least one file by creating a copy of said at least one file in the active storage without deleting said at least one file from said at least one of the active/inactive disk drives, and when the copy of said at least one file becomes inactive in the active storage, deleting the copy of said at least one file from the active storage.

11. A method of operating a file server for power savings, the file server including active storage containing frequently accessed files, and active/inactive disk drives for containing infrequently accessed files, said method comprising:
 (a) successively migrating groups of the files from the active storage to respective evacuated ones of the active/inactive disk drives, the files in each group of files being migrated when the files in said each group of files become inactive in the active storage, wherein the files in said each group of files are selected to have a similar probability of access when access to the active/inactive disk drive containing said each group of files reaches an inactivity threshold for powering down the active/inactive disk drive containing said each group of files; and
 (b) powering down the disk drive containing said each group of files when access to the active/inactive disk drive containing said each group of files reaches the inactivity threshold for powering down the active/inactive disk drive containing said each group of files;
 wherein said method further includes scheduling access to one of the active/inactive disk drives at a future time, and sending a power prefetch command to said one of the active/inactive disk drives so that said one of the active/inactive disk drives responds to the power prefetch command by transitioning from an inactive state to an active state by the future time, and accessing said one of the active/inactive disk drives at the future time.

12. A method of operating a file server for power savings, the file server including active storage containing frequently accessed files, and active/inactive disk drives for containing infrequently accessed files, said method comprising:
 (a) successively migrating groups of the files from the active storage to respective evacuated ones of the active/inactive disk drives, the files in each group of files being migrated when the files in said each group of files become inactive in the active storage, the active/inactive disk drives containing the groups of files being maintained in a queue by taking a respective active/inactive disk drive becoming a youngest one of the disk drives in the queue from a pool of evacuated disk drives, and returning an oldest active/inactive disk drive from the queue to the pool of evacuated disk drives once the oldest active/inactive disk drive from the queue has been evacuated;
 (b) responding to client requests for access to specified files in the active/inactive disks by promoting the specified files to the active storage and releasing storage of the specified files from the active/inactive disks containing the specified files;

(c) powering down the active/inactive disk drive containing said each group of files when access to the active/inactive disk drive containing said each group of files reaches an inactivity threshold for powering down the active/inactive disk drive containing said each group of files;

(d) maintaining a map in the active storage of used and unused storage in the active/inactive disk drives in the queue; and (e) accessing the map to plan for evacuation of at least one of the active/inactive disk drives in the queue by migrating files from said at least one of the active/inactive disk drives in the queue to released storage of at least some of the specified files; and then executing the plan to evacuate said at least one of the active/inactive disk drives in the queue.

13. The method as claimed in claim 12, which further includes selecting the files in each group of files to have a similar probability of access when access to the active/inactive disk drive containing said each group of files reaches an inactivity threshold for powering down the active/inactive disk drive containing said each group of files by computing a respective expulsion time for each of the files in the active storage, the respective expulsion time specifying when said each of the files in the active storage should be migrated from the active storage to one of the active/inactive disk drives for power savings, and maintaining an expulsion list of files in the active storage, the expulsion list being ordered by the respective expulsion time.

14. The method as claimed in claim 12, wherein the active storage includes at least a first level of relatively high-speed active storage and a second level of relatively low-speed active storage, and wherein the method further includes migrating the files from the first level of relatively high-speed active storage to the second level of relatively low-speed active storage based on inactivity of access to the files in the first level of relatively high-speed storage, and wherein files having been accessed after migration to the second level of relatively low-speed active storage require a greater time of access inactivity in the second level of relatively low-speed storage for migration to an active/inactive disk drive than files that have not been accessed after migration to the second level of relatively low-speed active storage.

15. A file server comprising:
at least one data processor programmed for responding to client requests for file access;
active storage coupled to said at least one data processor for client access to frequently accessed files in the active storage; and
active/inactive disk drives coupled to said at least one data processor for client access to infrequently accessed files in the active/inactive disk drives, each of the active/inactive disk drives having a power savings capability of powering down from an active state to a normally inactive state when access to said each of the active/inactive disk drives reaches an inactivity threshold;

wherein said at least one data processor is further programmed for successively migrating groups of the files from the active storage to respective evacuated ones of the active/inactive disk drives, the files in each group of files being migrated when the files in said each group of files become inactive in the active storage, and maintaining a queue of the active/inactive disk drives by migrating said each group of the files from the active storage to a respective evacuated active/inactive disk drive becoming a youngest active/inactive disk drive on the queue, promoting files in the active/inactive disk drives in the queue to the active storage in response to client requests for access to the files in the active/inactive disk drives in the queue, and evacuating files from an oldest active/inactive disk drive from the queue, and the respective active/inactive disk drive becoming a youngest one of the disk drives in the queue is taken from a pool of evacuated disk drives, and the oldest active/inactive disk drive from the queue is returned to the pool of evacuated disk drives once the oldest active/inactive disk drive from the queue has been evacuated.

16. The file server as claimed in claim 15, wherein the active storage includes at least a first level of relatively high-speed active storage and a second level of relatively low-speed active storage, and wherein said at least one data processor is programmed for migrating the files from the first level of relatively high-speed active storage to the second level of relatively low-speed active storage based on inactivity of access to the files in the first level of relatively high-speed storage, and wherein files having been accessed after migration to the second level of relatively low-speed active storage require a greater time of access inactivity in the second level of relatively low-speed storage for migration to the evacuated active/inactive disk drive becoming the youngest active/inactive disk drive on the queue than files that have not been accessed after migration to the second level of relatively low-speed active storage.

17. The file server as claimed in claim 15, wherein said at least one data processor is programmed for evacuating files from the oldest disk drive from the queue to an archival storage unit.

18. The file server as claimed in claim 15, wherein said at least one data processor is programmed for evacuating a not yet inactive one of the active/inactive disk drives in the queue for power savings by migrating files from the not yet inactive one of the active/inactive disk drives to released storage of files promoted from younger active/inactive disk drives in the queue.

19. The file server as claimed in claim 15, wherein said at least one data processor is programmed for maintaining a map in the active storage of used and unused storage in the active/inactive disk drives containing the infrequently accessed files, and accessing the map in the active storage for planning evacuation of at least one of the active/inactive disk drives containing the infrequently accessed files by migration of the infrequently accessed files in said at least one of the active/inactive files to unused storage of other ones of the active/inactive disk drives.

* * * * *